US008856136B2

(12) United States Patent
Yamakawa

(10) Patent No.: US 8,856,136 B2
(45) Date of Patent: Oct. 7, 2014

(54) INFORMATION UPDATE SYSTEM

(75) Inventor: Takashi Yamakawa, Yokohama (JP)

(73) Assignee: Diagonal, Inc., Yokohama (JP)

(*) Notice: Subject to any disclaimer, the term of this patent is extended or adjusted under 35 U.S.C. 154(b) by 118 days.

(21) Appl. No.: 13/390,809

(22) PCT Filed: Jun. 15, 2010

(86) PCT No.: PCT/JP2010/060124
§ 371 (c)(1),
(2), (4) Date: Feb. 29, 2012

(87) PCT Pub. No.: WO2011/021430
PCT Pub. Date: Feb. 24, 2011

(65) Prior Publication Data
US 2012/0150921 A1 Jun. 14, 2012

(30) Foreign Application Priority Data

Aug. 17, 2009 (JP) .................................. 2009-188596
Apr. 26, 2010 (JP) .................................. 2010-101284

(51) Int. Cl.
G06F 7/32 (2006.01)
G06F 17/30 (2006.01)
G06F 21/62 (2013.01)
G06Q 10/10 (2012.01)
(52) U.S. Cl.
CPC ...... *G06F 17/30557* (2013.01); *G06F 21/6245* (2013.01); *G06Q 10/10* (2013.01); *G06F 17/30345* (2013.01); *G06F 17/30371* (2013.01); *G06F 17/30368* (2013.01); *G06F 2221/2141* (2013.01)
USPC ............ 707/741; 707/758; 707/769; 707/805
(58) Field of Classification Search
CPC combination set(s) only.
See application file for complete search history.

(56) References Cited

U.S. PATENT DOCUMENTS

| 2005/0289180 | A1* | 12/2005 | Pabla et al. | 707/104.1 |
| 2006/0195472 | A1* | 8/2006 | Cadiz et al. | 707/104.1 |
| 2008/0222127 | A1* | 9/2008 | Bergin | 707/5 |
| 2008/0243789 | A1* | 10/2008 | Kussmaul et al. | 707/3 |
| 2008/0250106 | A1* | 10/2008 | Rugg et al. | 709/206 |
| 2009/0240657 | A1* | 9/2009 | Grigsby et al. | 707/3 |

FOREIGN PATENT DOCUMENTS

JP 2005107949 * 4/2005 ............ G06F 17/22

* cited by examiner

*Primary Examiner* — Bruce Moser
(74) *Attorney, Agent, or Firm* — William C. Schrot; Jeffrey I. Auerbach; AuerbachSchrot LLC

(57) ABSTRACT

An object of the present invention is to provide a novel information management program or system for mutually distributing and managing information limited by an information provider in terms of target for disclosure, for example, personal contact information such as contact information and private messages. A storage medium of a center system stores therein personal self-information, a receivers list, and a senders list as user information and personal contact information on other person as a sender's personal contact information database for each user, and the information processing device, when personal self-information stored in the storage medium is input or changed by a user, checks whether or not the user is registered for a sender on a senders list on each receiver, for each receiver registered in a receivers list on the user, and only for the registered receiver, writes at least some of the input or changed personal self-information in a sender's personal contact information database on the receiver stored in the storage medium, thereby automatically updating the content of the senders' personal contact information database on the receiver.

12 Claims, 23 Drawing Sheets

| USER A | | |
|---|---|---|
| USER INFORMATION | PERSONAL CONTACT INFORMATION | ... |
| | RECEIVERS LIST | B,C |
| | SENDERS LIST | B,D |
| SENDERS' PERSONAL CONTACT INFORMATION | USER B | ... |
| CONSISTENCY LIST | USER B | |
| INCONSISTENCY LIST | USER C | ... |
| | USER D | ... |

| USER B | | |
|---|---|---|
| USER INFORMATION | PERSONAL CONTACT INFORMATION | ... |
| | RECEIVERS LIST | A,C,D |
| | SENDERS LIST | A,C,D |
| SENDERS' PERSONAL CONTACT INFORMATION | USER A | ... |
| | USER C | ... |
| | USER D | ... |
| CONSISTENCY LIST | USER A | ... |
| | USER C | ... |
| | USER D | ... |

| USER C | | |
|---|---|---|
| USER INFORMATION | PERSONAL CONTACT INFORMATION | ... |
| | RECEIVERS LIST | B |
| | SENDERS LIST | B,D |
| SENDERS' PERSONAL CONTACT INFORMATION | USER B | ... |
| | USER D | ... |
| CONSISTENCY LIST | USER B | |
| | USER D | |
| INCONSISTENCY LIST | USER A | ... |

| USER D | | |
|---|---|---|
| USER INFORMATION | PERSONAL CONTACT INFORMATION | ... |
| | RECEIVERS LIST | B,C |
| | SENDERS LIST | A,B |
| SENDERS' PERSONAL CONTACT INFORMATION | USER B | |
| CONSISTENCY LIST | USER B | |
| | USER C | |
| INCONSISTENCY LIST | USER A | |

FIG.2

| OWN LANGUAGE | ENGLISH |
|---|---|
| 氏名 | Name |
| WORK-RELATED INFORMATION | |
| 肩書き | Title |
| 所属部署 | Section, Department, Division |
| 会社名 | Organization name |
| 会社住所 | Business Address |
| 会社メールアドレス | Business mail address |
| 会社電話番号 | Business phone number |
| 会社携帯電話番号 | Business mobile phone number |
| 会社FAX番号 | Business FAX number |
| 会社url | Organization url |
| PERSONAL CONTACT INFORMATION | |
| 個人用メールアドレス | Personal mail address |
| 個人携帯電話番号 | Personal mobile phone number |
| 個人url | Personal url |
| HOME INFORMATION | |
| 自宅住所 | Home address |
| 自宅電話番号 | Home phone number |
| 自宅FAX番号 | Home FAX number |

(A)

| USER SETTING OF ITEMS TO BE DISCLOSED | 1 | 2 | 3 | 4 |
|---|---|---|---|---|
| Name | ○ | ○ | ○ | ○ |
| WORK-RELATED INFORMATION | | | | |
| Title | ○ | | | |
| Section, Department, Division | ○ | | | |
| Organization name | ○ | | | ○ |
| Business Address | ○ | | | ○ |
| Business mail address | ○ | | | |
| Business phone number | ○ | | | ○ |
| Business mobile phone number | ○ | | | |
| Business FAX number | ○ | | | ○ |
| Organization url | ○ | | | ○ |
| PERSONAL CONTACT INFORMATION | | | | |
| Personal mail address | | ○ | ○ | |
| Personal mobile phone number | | ○ | ○ | |
| Personal url | | ○ | ○ | |
| HOME INFORMATION | | | | |
| Home address | | ○ | | ○ |
| Home phone number | | ○ | | ○ |
| Home FAX number | | ○ | | ○ |

RECEIVERS LIST

| NAME OF RECEIVERS | E-MAIL ADDRESS | ITEMS TO BE DISCLOSED | USER ID | CHECKING RESULT |
|---|---|---|---|---|
| USER B | bbb@··· | ··· | ··· | ○ |
| USER C | ccc@··· | ··· | ··· | △ |
| USER E | eee@··· | ··· | ··· | × |
| UNREGISTERED PERSON X | xxx@··· | ··· | | △ |

FIG.4

SENDERS LIST

| NAME OF SENDERS | E-MAIL ADDRESS | USER ID | CHECKING RESULT |
|---|---|---|---|
| USER B | bbb@··· | ··· | ○ |
| USER D | ddd@··· | ··· | △ |
| UNREGISTERED PERSON Y | yyy@··· | | △ |

FIG.5

SENDER/RECEIVER ENTRY SCREEN

NAME

E-MAIL ADDRESS

☐ RECEIVER    ☐ SENDER

ITEMS TO BE ☐   USER SETTING 1
DISCLOSED       ITEMS TO BE DISCLOSED ▽

☐ ALL

☐ WORK-RELATED    ☐ PERSONAL CONTACT    ☐ HOME ADDRESS
  INFORMATION       INFORMATION

☐ ORGANIZATION NAME    ☐ PERSONAL E-MAIL       ☐ HOME ADDRESS
  ☐ BUSINESS ADDRESS     ☐ PERSONAL PHONE NUMBER ☐ HOME PHONE NUMBER
  ☐ BUSINESS PHONE NUMBER ☐ PERSONAL URL         ☐ HOME FAX

FIG.6

| USER A | | |
|---|---|---|
| USER INFORMATION | PERSONAL CONTACT INFORMATION | ... |
| | RECEIVERS LIST | B,C,X |
| | SENDERS LIST | B,D,X |
| SENDERS' PERSONAL CONTACT INFORMATION | USER B | ... |
| | USER D | ... |
| | USER Y | ... |
| CONSISTENCY LIST | USER B | |
| INCONSISTENCY LIST | USER C | ... |
| | USER D | ... |
| | USER X | ... |
| | | ... |

| USER X | | |
|---|---|---|
| USER INFORMATION | PERSONAL CONTACT INFORMATION | ... |
| INCONSISTENCY LIST | USER A | ... |

| USER Y | | |
|---|---|---|
| USER INFORMATION | PERSONAL CONTACT INFORMATION | ... |
| INCONSISTENCY LIST | USER A | ... |

OUTPUT SCREEN

OUTPUT INFORMATION
- ☐ ALL
- ☐ PERSONAL CONTACT INFORMATION
- ☐ RECEIVERS LIST
- ☐ CONSISTENCY LIST
- ☐ SENDERS LIST
- ☐ INCONSISTENCY LIST
- ☐ PERSONAL CONATCT INFORMATION DATABASE (OF SENDERS)
  - ☐ ALL  ☐ ADDRESS LIST  ☐ PHONE BOOK
    - ☐ ORGANIZATION NAME
    - ☐ PERSONAL E-MAIL
    - ☐ HOME ADDRESS
    - ☐ BUSINESS ADDRESS
    - ☐ PERSONAL PHONE NUMBER
    - ☐ HOME PHONE NUMBER
    - ☐ BUSINESS PHONE NUMBER
    - ☐ PERSONAL URL
    - ☐ HOME FAX (B)

RECEIVERS LIST BROWSING SCREEN                    [OUTPUT] 16

| RECEIVERS | E-MAIL ADDRESS | ITEMS TO BE DISCLOSED |
|---|---|---|
| USER B | bbb@··· | PERSONAL CONTACT INFORMATION |
| USER C | ccc@··· | WORK-RELATED INFORMATION |
| USER X | xxx@··· | HOME INFORMATION PERSONAL CONTACT INFORMATION |
|  |  |  |
|  |  |  |
|  |  |  |
|  |  |  |
|  |  |  |

FIG.16

INFORMATION UPDATE SYSTEM

TECHNICAL FIELD

The present invention relates to an information management program or system for mutually distributing and managing information in an information processing device connected to a network, and more particularly, relates to an information management program or system for mutually distributing and managing information limited by an information provider in terms of destination for disclosure, for example, personal contact information such as contact information, in an information processing device connected to a network. Specifically, the present invention encompasses an information management program or system for keeping up-to-date information for a personal contact information database on other person, which is used as a list of contact information such as an address list, an address book, and a photo book.

BACKGROUND ART

In general, contact information on acquaintances such as friends and clients is recorded on an address list, an address book, a phone book, etc. (hereinafter, referred to as "a list of contact information"), and managed. While each piece of information has been written in a paper address list or phone book conventionally, along with the popularization of personal computers and cellular phones recently, it has been often the case that each piece of contact information is input in these storage media through an address book, an address list, a phone book, etc. in various types of software, and managed as electronic information. For processing of writing or inputting acquaintance contact information in these lists of contact information, the acquaintance contact information is manually written, input, or updated in the lists of contact information on the basis of information distributed in writing or orally, such as name cards, electronic mails, postcards, and fax.

When a name, a home address, a phone number, etc are changed because of a move or a marriage, or when own company name, company address, phone number, and e-mail address, etc. are changed because of an employment, a carrier change, a transfer, or the like, there is a need to inform, of new information, the other party with contact self-information input in the list of contact information. In this case, by reference to a list of contact self-information, the new information is reported to each piece of contact information by an electronic mail, a postcard, a facsimile, a telephone, etc., or reported by giving a name card or orally in the case of meeting face to face.

However, it is cumbersome to inform a large number of pieces of contact information individually, and there is a possibility of causing errors in input of information or notification failures. While the use of electronic mails can transmit information to more than one piece of contact information in a lump, all of the pieces of contact information are not always informed of the same information, the work is thus hard for selecting and figuring out combinations of contact information with notification information, and a large amount of time and labor will be spent. For example, when a carrier is changed to change both a personal address and phone number and a business address and phone number, whether to inform only the business address and phone number, only the personal address and phone number, or the both must be selected depending on the contact information, delays and errors in notification are likely to be caused. In addition, the contact information in a list of contact self-information is not updated to up-to-date information in some cases, and failures in notification may be caused due to incorrect contact information.

For the party receiving information, it is considerably cumbersome to manually write or input the received information in an address list, etc., or update the written or input information, and errors in input of information and failures in update are often caused due to the manual operation. The increase in the amount of information input requires time just for searching previous information related to the received information. As described above, it is difficult in the prior art for the content of a list of contact information of recorded personal contact information on other person to be always kept up-to-date content, and it is often the case that it is impossible to keep in contact. While these lists of contact information are frequently used for specific persons, it is often the case that the lists of contact information are used only a few times a year for the other persons, such as uses for sending New Year's greeting cards, Christmas cards, greeting cards (promotions, transfers, carrier changes, employment, retirement, moves, changes of e-mail addresses, changes of cellular phone numbers, etc.), etc., and whether other's address, title, etc. are correct or not has to be confirmed each time, resulting in an immense amount of effort in total for each person.

Furthermore, as the lists of contact information managed as electronic information, more than one type of software each has an independent list of contact information therein, which may be application software for personal computers, such as spreadsheet software, Web-browsing software, e-mail software, postcard address printing software, and scheduling software, phone books of cellular phones, etc, and an fair amount of effort has been also required to match the contents of respective address lists, etc, and keep the contents up-to-date information. While the lists of contact information can be subjected to mutual data conversion in some cases, even in such cases, there is a need for conversions, or a need for confirming which piece of information is the latest, and fundamental solving means has been thus required.

Patent Document 1 discloses, as a method for modifying and delivering personal contact information with the use of a computer, a method in which a personal contact information provider modifies related personal contact information, a computer system connected via a computer network updates and stores the personal contact information, and the computer system delivers only permitted delivery matters of the personal contact information to a delivery destination if the delivery destination set by the personal contact information provider requires an update.

Now, electronic mails, message boards, and RSS (RDF Site Summary of Rich Site Summary) have been known as methods for distributing information in information processing devices connected to a network. The electronic main is intended to transmit letters electronically, and refers to a system which allows a sender to transmit information to a specific destination if the sender knows an address of the destination, and which is a system basically opened to the public, although an information provider specifies a destination, whereas an information receiver is able to ser individual mail rejections. The message board refers to a system for an information provider to disclose information to the public, and a system for an information receiver to browse specific information with the aid of a search tool. The RSS refers to a system for delivering information from an information provider to registrants by the registration for the information provider, and a system for the information provider to disclose information to the public, and for an information receiver to specify an information provider and request a delivery.

PRIOR ART DOCUMENTS

Patent Documents

Patent Document 1: Japanese Patent Application Laid-Open No. 2001-243186

SUMMARY OF INVENTION

Technical Problem

Definitely, according to the method in Patent Document 1, via a computer network, if a delivery destination set by a personal contact information provider requires an update, information input by the personal contact information provider is delivered, and input automatically, and thus, the complication due to manual entry is resolved substantially.

However, the method in Patent Document 1 refers to a PULL-type system which updates an address list, etc, on a delivery destination (information receiver) to the latest content, only after the delivery destination actively requires an update to retrieve personal contact information provided by a personal contact information provider (paragraph 0040 in Patent Document 1). The PULL type refers to a mechanism in which a delivery destination (information receiver) must confirm whether or not there is any updated information with personal contact information storage sections for all of personal contact information providers listed by the delivery destination to retrieve information before actually using an address list, etc. For this reason, the timing of the update is determined by the timing of an update requirement operation from a delivery destination, and unless there is any update requirement operation from a delivery destination, personal contact information on personal contact information providers recorded on the delivery destination will not be updated even in the case of always-on connection to the network. The delivery destination has no idea when information is input or updated by the personal contact information provides, there is thus a possibility that any update requirement operation is not carried out at a required timing, and there is also a possibility that the update requirement operation is forgotten. Therefore, the method in Patent Document 1 has not been sufficient yet as a system for keeping up-to-date personal contact information.

In addition, even if a delivery destination (information receiver) does not desire to receive personal contact information on a personal contact information provider, the personal contact information is provided on setting as a delivery destination by the personal contact information provider, and the information is updated. Thus, there is a possibility that necessary information will be buried in unnecessary personal contact information, and there is also a risk for the generation of new problems similar to junk e-mails.

Moreover, a delivery destination set as delivery destinations from a large number of personal contact information providers needs to carry out a large number of processing steps of: in accordance with the update requirement operation, informing a large number of personal contact information providers each of an update requirement signal; determining whether or not the information is updated for each of personal contact information providers; and receiving the updated information if the information is updated. Each time the update requirement operation is carried out, a large number of processing steps requires a long period of processing time, and the processing capacity of the system is consumed, thereby possibly causing system failures.

In addition, the update processing is started after the update requirement operation of the delivery destination, thus, the delivery destination is not allowed to use up-to-date personal contact information until the update processing is completed, and not allowed to instantly access to up-to-date personal contact information if personal contact information is required urgently.

In view of the prior art described above, an object of the present invention is to provide a novel information management program or system for mutually distributing and managing information limited by an information provider in terms of target for disclosure, for example, personal contact information such as contact information and private messages, in an information processing device connected to a network. In addition, another object of the present invention is to provide an information management program or system for mutually distributing personal contact information such as contact information, and keeping a personal contact information data base on other person up-to-date, which can be used as a list of contact information by each user. Furthermore, another object of the present invention is to provide an information management program or system for not only managing personal contact information in an information management system, but also systematically incorporating destinations into the information management system, who have not been involved yet in the information management system, thereby making it possible to easily enlarge the number of users of the information management system.

Solution To Problem

In order to solve at least one of the objects, the information update system according to the present invention is an information update system comprising a center system and a client system which are connected via a network, the center system comprising an information processing device which is able to be connected to the network and a storage medium, the storage medium of the center system for storing therein personal self-information, a receivers list, and a senders list as user information and personal contact information on other person as a sender's personal contact information database for each user, the information processing device for automatically updating the content of the sender's personal contact information database, characterized in that: a user is able to use the client system to input or modify personal self-information in user self-information stored in the storage medium; a user is able to use the client system to register or change a receiver in a receivers list in user self-information stored in the storage medium, the receiver for permitting at least some of personal self-information stored as user information to a sender person information database on other user; a user is able to use the client system to register or change a sender in a senders list in user self-information stored in the storage medium, the sender for, when personal contact information on other user is transmitted, permitting the personal contact information to be received to change the content of a self-sender's personal contact information database; and the information processing device, when personal self-information stored in the storage medium is input or changed by a user, checks whether or not the inputting or modifying user is registered for a sender on a senders list in user information on each receiver, for each receiver registered in a receivers list in user information on the inputting or modifying user, and only for the registered receiver, writes at least some of the input or changed personal self-information in a sender's personal contact information database on the receiver stored in the storage medium, thereby automatically updating the content of the sender's personal contact information database on the receiver.

Alternatively, in the information update system according to the present invention, the information processing device, when a receiver is registered by a user in the receiver list in the user information, checks whether or not the user registering the receiver is registered for a sender on a senders list in user information on the registered receiver, and only if the user is registered, writes, in a sender's personal contact information database on the receiver, at least some of the personal self-information in the user information on the user registering the receiver, thereby automatically updating the content of the senders' personal contact information database on the receiver.

Alternatively, in the information update system according to the present invention, the information processing device, when a sender is registered by a user in the sender list in the user information, checks whether or not the user registering the sender is registered for a receiver on a receivers list in user information on the registered sender, and only if the user is registered, writes, in a sender's personal contact information database on the user registering the sender, at least some of personal self-information in the user information on the sender, thereby automatically updating the content of the senders' personal contact information database on the user registering the sender.

Furthermore, in the information update system, if the user is not registered as a result of the checking, information indicating that the user is not registered is preferably registered in an inconsistency list on at least either one user. In addition, the user is more preferably allowed to achieve the function of registering the user registered in the inconsistency list as a receiver in the receiver list or a sender in the sender list in the user information by reference to the inconsistency list on the user.

Furthermore, in the information update system, if the user is registered in the inconsistency list, then registered as a receiver or a sender, and thereby registered mutually, the function of deleting the registration in the inconsistency list is preferably achieved.

Furthermore, in the information update system, if the user is registered as a result of the checking, it is preferable to register the relationship in a consistency list, and in the checking, to refer to the consistency list or the inconsistency list first, and check against user information on the other part if the user is not registered in the consistency list or the inconsistency list.

Advantageous Effects of the Invention

In the information update system in the information management system achieved by the information management program according to the present invention, the registration of a receiver in a receivers list by an inputting person means an intention of the input person: "permitting the disclosure of personal self-information to the receiver", whereas the registration of a sender in a senders list by an inputting person means an intention of the input person: "permitting personal contact information from the sender to be received to modify the content of a sender's personal contact information database on the inputting person". Further, this information management system is a system which allows the operation of a user as an inputting person to modify a sender's personal contact information database on other person, although the modification is limited to a case in which an information disclosure intention of a user is consistent with an information modification intention of other user.

Furthermore, in this information management system, the result of checking an intention of disclosing information against an intention of receiving and rewriting information is preferably stored as checking result information. More specifically, if the intention of disclosing information is consistent with the intention of receiving and rewriting information, the relationship is registered in a consistency list, and if not, the relationship is registered in an inconsistency list. The inconsistency refers to a state in which to one intention, the other intention is not made, ant then, the permission of the other provides a consistent state to disclose and rewrite information, whereas the rejection of the other provides a rejection state. As for the rejection state, several embodiments are conceivable in terms of effect, and for example, the system can be also adapted so that not only the disclosure and rewriting of information but also the notification of inconsistency, etc. are not permitted between the both, unless the rejecting user carries out a release operation afterward. It is to be noted that when a receiver is deleted from a receivers list, or when a sender is deleted from a senders list, the relationship with the receiver or the sender will be brought into a rejection state, in which the disclosure or rewriting of information is not carried out.

In general, other's free browsing, copying, or modification of information recorded on a personal recording area involves risk such as leak and diffusion of information and falsification of the content. However, in this system, the registration in the receiver list and the sender list permits an intention of information disclosure or information modification, and the disclosure of information and the automatic modification of information under the condition of consistency with a corresponding intention of the other party. In this information management system 1, one or more of the following advantageous effects can be achieved by inputting the personal contact information, the receiver list, and the sender list as the user information.

First, each user can centralize and manage personal self-information. More specifically, if personal contact information in this information management system is updated to up-to-date information, the up-to-date personal self-information can be gained by referring to or downloading the personal self-information registered in this information management system, when the input of the personal self-information is required in individual applications (for example, name card creating software and postcard creating software) and more than one information processing device (home personal computers, cellular phones, company personal computers, etc.).

Secondly, each user can manage receivers in a lump by registering, in a receivers list, receivers to which at least some of personal self-information is permitted to be disclosed. Furthermore, the consistency with a receiving intention of a receiver (registration in a sender) can provide updated information in a lump to the other party (receiver) requiring the update of personal self-information, and also allows a sender's personal contact information database on each receiver to be rewritten automatically. For this reason, each user can manage the senders' personal contact information database to up-to-date information for each receiver registered in the receiver list. In addition, the items of personal contact information to be transmitted (transmission content) for each receiver can be also managed by setting items to be disclosed for each receiver.

Thirdly, each user can manage senders in a lump by registering, in a senders list, senders permitted to receive personal contact information on other person when the personal contact information is transmitted. Furthermore, the consistency with an intention of a sender to disclose personal contact information (registration in a receiver) can manage, as a sender's personal contact information database, personal contact information on the other person (sender) automatically to the up-to-date information.

In addition, the storage of the checking result information can, in addition to the advantageous effect of ability to increase the checking speed, manage receivers that succeed in updating personal contact information and receivers that fail to update personal contact information, and manage senders that succeed in receiving personal contact information and senders that fail to receive personal contact information, and further figure out whether or not the receivers or senders are interested in self. It is to be noted that other advantageous effects will be clarified in the following embodiments.

BRIEF DESCRIPTION OF DRAWINGS

[FIG. 2] An example of a data formation in relation to each user.

[FIG. 3] (A) an example of items of personal contact information on an inputting person; and (B) an example of user setting of items to be disclosed.

[FIG. 4] An example of a receivers list.

[FIG. 5] An example of a senders list.

[FIG. 6] An example of an entry screen for a receivers list and a senders list, displayed on a display unit of an information processing device in a client system.

[FIG. 12] Examples of data formations in connection with each user and unregistered persons.

[FIGS. 16] (A) and (B) are examples of an output screen displayed on a display unit of an information processing device in a client system.

DESCRIPTION OF EMBODIMENTS

Figure 1:
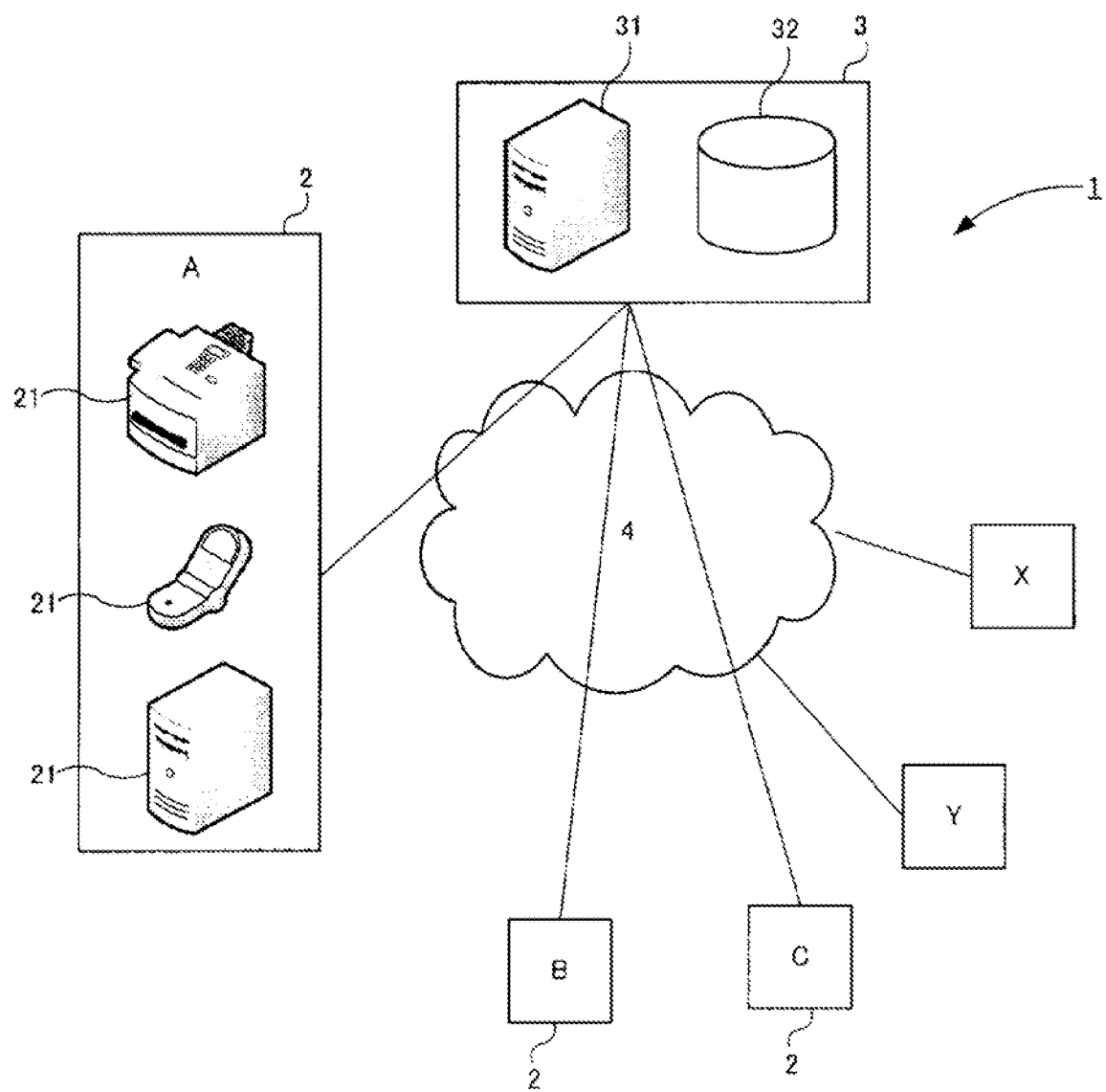
[FIG. 1] A schematic configuration diagram of the whole of a personal contact information management system according to the present invention.

While embodiments of the present invention will be described below with reference to the drawings, the present invention is not to be considered limited to the following examples. FIG. 1 is a schematic configuration diagram of the whole of an information management system 1 according to the present invention. First of all, individual elements and basic information processing will be described for the information management system 1 using a program according to the present invention, and then, the information management system 1 using a program according to the present invention will be described which achieves a more complex function. It is to be noted that in this specification, a system user is referred to as a "user", a user who inputs personal contact information is referred to as an "inputting person", and a person who has not been used the system yet is referred to as an "unregistered person", while a user A will be described as the inputting person for the inputting person in the description of flowcharts described later, unless otherwise designated.

The information management system 1 is composed of a system on the client side (hereinafter, referred to as a "client system") 2 connected with a network (telecommunication line) 4, and of a system on the center side (hereinafter, referred to as a "center system") 3. The network 4 is a duplex transmission line which allows two-way communication between information processing devices, examples of which include, for example, the Internet, WAN (Wide Area Network), and LAN (Local Area Network).

While the client system 2 and the center system 3 are shown separately in FIG. 1, the functions thereof are merely distinguished from each other, and there is no need to configure the systems separately. The client system 2 can be made to share a part thereof, for example, an information processing device, a storage device, etc. with the center system 3.

The client system 2 refers to a system which allows input and output of personal contact information, etc. between the center system 3 and users, and is achieved by using software for a client in an information processing device 21 which is able to be connected to a network including an input unit and an output unit. As the information processing device 21, for example, computers, home game machines, televisions, video recorders (DVD recorders, HDD recorders, etc.), and mobile devices (cellular phones, PDA (Personal Digital Assistant), portable game machines, etc.) can be used.

For the input unit, one or more can be used from among character and command input units such as keyboards, mouses, controllers, and stylus pens, image input units such as scanners and cameras, electronic information input units such as CD drives, DVD drives, USB memories, memory card readers, contact-type IC card readers, and non-contact IC card readers, etc. It is to be noted that the input unit may be achieved by inputting through a network line, a wireless LAN, or the like with the use of an input unit of other information processing device.

For the output unit, one or more can be used from among image display devices such as displays and projectors, printing devices such as printers, audio output units such as speakers, and electronic information input units such as CD-RW drives, DVD-RW drives, USBs, and e-mail software.

The software for a client achieves, for the information processing device 21, at least (1) the function of inputting or editing, by a user, user information (including personal contact information, receiver list, and sender list) through the input unit; (2) the function of transmitting the input or edited user information to the center system 3; and (3) the function of receiving at least a portion of a sender's personal contact information database from the center system 3, and outputting at least the received portion of the senders' personal contact information database to the user through the output unit. Furthermore, the software for a client can achieve the function of authenticating a user registration, the function of identifying user information, the function of inputting, editing, extracting approved contact personal contact information, the function of converting data, etc., in addition to the functions described above, or as part of the functions.

The software for a client may be used by installing a program for a client on the information processing device 21, or may be provided in the form of so-called application service in which the function of a program for a client, which is executed in the center system 3, is used in the information processing device 21 by connecting to the center system 3 over a line. When the software for a client is provided in the form of application service, various types of functions can be achieved through the execution of the program although the program is not copied onto the information processing device 21 in the client system 2, and the program can be considered to be provided substantially. Furthermore, the form of application service is superior in terms of convenience, because there is no need to install the program onto each information processing device when users connect to the center system 3 from a plurality of information processing devices, or when users use information processing devices of others. On the other hand, when the program is installed onto the information processing device 21, the program may be downloaded and installed online through a network, or may be installed from a storage medium such as a CD-ROM with the program stored thereon. If the client software is installed on the information processing device 21, the user information can be input, edited, etc. even with the network off-line. In this case, in connecting to the center system 3 over a line, the user information may be updated so as to be brought up to date between the online input or edited user information in the client system 2 and the user information stored in the center system 3.

The center system 3 refers to a system which carries out the accumulation, management, etc. of the information input by the client system 2, and is achieved by using software for the center with the use of an information processing device 31 including an arithmetic processing unit which is able to be connected to a network and of a storage medium 32. As the information processing device 31, for example, one or more computers, or one or more servers can be used, and the information processing device 31 of the center system 3 can also share with the information processing device 21 of the center system 2.

The storage medium 32 stores at least user information and a sender's personal contact information database. The storage medium 32 may be a hard disk connected to the information processing device 31 directly or through a network and built in the information processing device 31, or may be a data warehouse provided separately from the information processing device 31. The storage medium 32 may be distributed for storage across storage media of a plurality of information processing devices 31. It is to be noted that the user information and senders' personal contact information database on each user may be stored in relation to each user as the data formation in the storage medium 32. The accumulation in relation to each user refers to being ready to specify or output the user information and senders' personal contact information database on an identified user by inputting user identifying information. More specifically, any data formation may be adopted as long as it is possible to take the user information and senders' personal contact information database on a user by identifying the user.

FIG. 2 is an example of the data formation of user information and senders' personal contact information database stored in the storage medium 32 in relation to respective users A to D. The user information includes information regarding a user, which is provided from an inputting person with the use of the software for a client, and user identifying information such as a password and a user ID (including a user ID input by the user on his own or a user ID assigned automatically by the system), and specifically, the user information includes a receivers of own personal contact information for registering a receiver to which personal contact information on an inputting person (his own self) or at least some of personal contact information on an inputting person is allowed to be transmitted, and a senders list for registering a sender to which the transmission is allowed in the case of transmitted personal contact information on others. In addition, the user information may include, in relation to the receiver list, items to be disclosed individually set for each receiver, and items to be disclosed which is set in advance by the user. Furthermore, the user information may include checking result information (a consistency list, an inconsistency list, or a rejection list) regarding the receiver or sender in the receiver list or sender list.

As the user identifying information, one or more pieces can be used from information for identifying the user, such as a user name, an e-mail address, and a user ID. The user name may be an identical name in some cases, and it is not necessarily appropriate to suggest that the user name can identify an individual absolutely. While there is only one address for the same e-mail address, one may have more than one address, and more than one person may share an address with each other. Thus, it is also not necessarily appropriate to suggest that the e-mail address can identify an individual absolutely.

For this reason, it is preferable to input the user name and the e-mail address as the user identifying information input as the receiver or sender or input for registration by the user. Inputting the user name is preferable because the user name is commonly used as information for identifying the user, the most basic information as personal contact information, and kept in memory by the user himself. In addition, the e-mail address is preferable because the address itself is unique and like nothing else, and because it is possible to electronically make contact with the user. Then, these two pieces of information can be combined to further identify the individual. It is to be noted that it is also possible to include only the user ID and the e-mail address which is also used as contact information.

The user ID is unique to the user, thus corresponds to the user one-on-one, and can be used for identifying and managing the user. The user ID can be also set by the user, or released to the user and used by the user as user identifying information. However, there are problems such as a security issue due to leakage of the user ID, a problem of complication in ID input (the input may be repeated many times until the ID unique to the user can be set, because any redundant ID is not allowed to be registered), and a distance kept from the system due to forgetting the ID or making an error the ID. For this reason, for the user ID, the center system 3 preferably sets a user ID corresponding to the user automatically in the registration of the user, and furthermore, the user ID set by the system is preferably used for user identification in the system without releasing the user ID to the user. Further, it is also possible to adopt a form in which the user ID is disclosed to the individual in order to use the user ID as user identifying information for login without disclosing the user ID to other users (a mode in which the receiver or sender is not allowed to be specified with the user ID). When each piece of information is managed with the user ID, it is also possible to achieve the modification of some pieces (for example, the user name, the e-mail address) of the user identifying information with relative ease. However, when the user identifying information is modified, it is preferable to increase the security measure in order to prevent user spoofing. The processing for modifying the user name and the e-mail address for will be described later.

As for data on the user A in FIG. 2, personal self-information, a receivers list including the users B and C registered as receivers, and a senders list including the users B and D registered as senders are stored as the user information, whereas personal contact information on the user B, which is received from the sender registered in the sender list is recorded as the senders' personal contact information database. Also for the users B, C, and D, as shown in FIG. 2, the same items are recorded as the data formation, although the items differ in content. Furthermore, if necessary, checking result information such as a consistency list registered if a transmitting intention is consistent with a receiving intention and an inconsistency list registered if not is also recorded in relation to the respective users A to D.

The items of the personal self-information input by an inputting person may include, for example, the user ID, the name, work-related information such as the name of his place of work, the name of his department, his title, the address of his place of work, the phone number of his place of work, the FAX number of his place of work, the e-mail address of his place of work, the mobile phone number of his place of work, and the address of a homepage for his place of work, personal contact information such as his home address, his home phone number, his home FAX number, his personal e-mail address, his personal mobile phone number, and the address of his personal homepage, and further, more personal contact information such as his age, birth date, blood type, sex, location, alma maters, hobby, and family structure, which are input by the inputting person. In addition, the personal self-information includes not only information containing the contact information, but also information limited by the inputting person in releasing extent for desiring to receive information on at least some other users. For example, information regarding schedules, personal opinions on certain matters (for example, sightseeing, TV programs, movies, shops, etc.), etc. may be transmitted and received. It is to be noted that the information management system is intended to transmit personal self-information to a receiver, receive personal contact information on a sender to create a sender's personal contact information database, and automatically update the content of the senders' personal contact information database, and thus not to be considered limited to the information mentioned above, as long as information matches the intended use.

In addition, the user may be not only a natural person, but also such a system as a corporation or an organization which, as s subject, considers information regarding the corporation or organization itself as personal self-information, transmits the information to other natural person, corporation, or organization, and receives personal contact information on other natural person, corporation, or organization. For example, in addition to the locations and contact information of the head office and branch offices in the corporation or organization, the names and contact information for each title, as well as the names and contact information for a person in charge of materials, a person in charge of human resources, a person in charge of public relations, etc. can be considered as personal self-information. Furthermore, in the case of a corporation user, the system can be also used as a system for collecting personal contact information regarding specific people such as shareholders and purchasers, as an address list for transmitting or reporting, to the specific people such as shareholders and purchasers, information on decisions at a shareholders meeting, product recalls, etc., which is input as personal self-information.

More over, it is also possible for the personal contact information to be ready for choking the previous update history thereof. More specifically, is possible to save the history of the personal contact information by storing the updated content for each update, including the content of personal contact information at the time of registration. While the personal contact information may be all saved for each update, it is preferable to save only the updated part for the purpose of reducing the storage capacity. The saved history of the personal contact information makes it possible to search for not only up-to-date personal contact information for each user, but also previous personal contact information for each user, which is saved as a history, in the case of checking whether or not information or contact information (for example, the name and the e-mail address) for identifying a receiver or a sender is consistent with a user already registered in the system, in processing for checking a receiver or a sender (see FIG. 11) as described later. While the e-mail address itself is like nothing else, the e-mail address is likely to be changed relatively frequently, for a reason such as a carrier change, a change in the model of a mobile terminal, a change of a provider, or a measure against junk e-mails. For this reason, for example, just supposing a situation that the previous e-mail address is known even though the current e-mail address is not known such as having a name card before a carrier change, the adoption of, as a process of checking, a process for searching from information including previous personal contact information for each user, which is saved as a history, can identify the already registered user from the history, even when the name and previous e-mail address are input.

FIG. 3(A) is an example of items for personal contact information on an inputting person. The personal contact information can be input through an entry screen displayed by executing a program installed on the information processing device 21 or executing personal contact information input processing while connecting to the center system 3 over a line, or via other compatible software. Alternatively, a name card, a resume, a two-dimensional bar code, etc. may be captured by an image input unit, and input through character recognition or decode function, electronic information such as an address list, an address book or a phone book stored in the information processing device 21 may be converted by conversion function into a format for the system and input, or electronic information stored on a CD, a DVD, an IC card, or the like may be input by an electronic information input unit.

The receiver list is intended for the registration of receivers to which at least some of personal self-information is allowed by an inputting person to be transmitted, and has at least one or more input pieces of information for specifying a receiver or of contact information. The information for specifying the receiver includes a user ID, a user name, or an e-mail address, whereas the contact information includes an e-mail address, a phone number, and an address. It is preferable, for the same reason described above, to input the name and the e-mail address as the information for specifying the receiver or the contact information. In this case, the information for specifying the receiver (the name or the contact information) should be considered as an indispensable input item when a user is registered in the system. In addition, when the user ID is released to the user, the user ID may be input for specifying the receiver.

The receiver list may be allowed to set items of personal contact information to be transmitted, for each receiver. For example, while the personal contact information may be all transmitted to personally close friends or family members, a restriction is put so that only information regarding business is transmitted to business acquaintances. While the receiver list may be configured such that each item in FIG. 3(A) can be selected, the receiver list preferably has, because of its large number of items, the function of allowing more than one item to be set in a lump. As the function, the system may set inclusive items for more than one item, for example, "all", "personal contact information", "work-related information", etc., to provide the function of allowing these inclusive items to be selected, or items to be disclosed composed of more than one item set in advance by a user may be saved to provide the function of allowing these items to be disclosed (user setting of items to be disclosed) to be selected. FIG. 3(B) is an example of the user setting of items to be disclosed. In FIG. 3(B), the items indicated by circles refer to items to be transmitted, where the user setting 1 of items to be disclosed refers to a setting for transmitting all items of work-related information, the user setting 2 of items to be disclosed refers to a setting for transmitting personal contact information and home information, the user setting 3 of items to be disclosed refers to a setting for transmitting only personal contact information, and the user setting 4 of items to be disclosed refers to a setting for transmitting some pieces of work-related information and home information. Of course, the receiver list may be configured such that the inclusive items or/and user settings of items to be disclosed are allowed to be selected after allowing each item of personal contact information to be selected. For this function of user setting of items to be disclosed, the client system 2 or the center system 3 needs to have the function of inputting, editing, and saving the user settings of items to be disclosed.

FIG. 4 is an example of the receiver list. In FIG. 4, there are receivers' name, an e-mail address, and items to be disclosed as items input by a user, and the item of a user ID is input by the center system 3 in order to manage the correspondence relationship among users in the system. In addition, the item of a checking result is obtained by reflecting the result of checking a receiver with a senders list or an intention of a receiver, in order to briefly confirm the necessity of transmission, and input by the center system 3, if necessary. In the item of the checking result, a circle means availability for transmission to a receiver (consistency), a triangle means no intention made by a receiver (inconsistency), and a cross means a sender rejected by a receiver (rejection). More specifically, the item of the checking result serves as a consistency list, an inconsistency list, and a rejection list. The item of the checking result is preferably reported to the user, and for example, characters or symbols may be directly noted, or receivers in the receiver list may be indicated by color coding (e.g.: blue for consistency, yellow for inconsistency, and red for rejection). In addition, the system may allow not only the users in the system but also an unregistered person X which has not used the system yet to be registered as the receiver. The processing for an unregistered person will be described later.

The sender list is intended for the registration of senders allowed by an inputting person to receive personal contact information of other people, and has at least one or more input pieces of information for specifying a receiver or of contact information. The information for specifying the sender includes a user ID, a user name, or an e-mail address, whereas the contact information includes an e-mail address, a phone number, and an address. It is preferable, for the same reason described above, to input the name and the e-mail address as the information for specifying the sender or the contact information. In this case, the information for specifying the sender (the name or the contact information) should be considered as an indispensable input item when a user is registered in the system. In addition, when the user ID is released to the user, the user ID may be input for specifying the sender. While it is not important for the sender to select items to be received because the sender is in a position to receive personal contact information, the sender may be allowed to select items to be received.

FIG. 5 is an example of the sender list. In FIG. 5, there are sender names and e-mail address as items input by a user, and the user ID in FIG. 5 is input by the center system 3 in order to manage the correspondence relationship among users in the system. In addition, the item of a checking result is obtained by reflecting the result of checking a sender with a receivers list or an intention of a sender, in order to briefly confirm the necessity of reception, and input by the center system 3, if necessary. In the item of the checking result, a circle means availability for reception by a sender (consistency), a triangle means no intention made by a sender (inconsistency), and a cross means a reception rejected by a sender (rejection). More specifically, the item of the checking result serves as a consistency list, an inconsistency list, and a rejection list. The item of the checking result is preferably reported to the user, and for example, characters or symbols may be directly noted, or senders in the sender list may be indicated by color coding (e.g.: blue for consistency, yellow for inconsistency, and red for rejection). In addition, the system may allow not only the users in the system but also an unregistered person X which has not used the system yet to be registered as the sender. The processing for an unregistered person will be described later.

The receiver list and the sender list can be input through an entry screen displayed by executing a program installed on the information processing device 21 or executing personal contact information input processing while connecting to the center system 3 over a line. The receiver list and the sender list have many input items in common from FIGS. 4 and 5, and it is thus preferable to allow both of the lists to be input at the same time. FIG. 6 is an example of a screen for inputting the receiver list and the sender list, which is displayed on a display unit of the information processing device 21 in the client system 2. In FIG. 6, there are check boxes of "receiver" and "sender" below entry fields for the "name" and "e-mail address", so that input contact information can be registered in the receiver, the sender, or both thereof. In the lower section, check boxes for setting items to be disclosed are provided so that checked items can be set as personal contact information to be transmitted to a receiver in the case of registration in the receiver.

The senders' personal contact information database refers to a database for accumulating respective items of personal contact information on a sender, which is transmitted from the sender registered in a senders list. While the name and contact information of, or the user ID of a registered sender may be tentatively recorded as contact information database of approved link partners into the database on registration in a senders list (sender registration type), or the sender and personal contact information thereon may be newly registered as contact information database of approved link partners into the database on receiving the personal contact information from the sender (personal contact information registration type), the sender registration type is preferred. In the case of the personal contact information registration type, the registration into the database is executed only after the relationship with the sender is consistent, and the sender is thus not registered as a list of contact information before achieving the consistency, and not consistent with the list of contact information desired by the inputting person. In contrast, in the case of the sender registration type, the registration in the list of contact information is executed when the registration in the sender list is executed, the sender is thus on the list just without personal contact information thereon received. If the inputting person is allowed to input and change the contact information database of approved link partners, although the accuracy of information is not secured, it is possible to use the senders' personal contact information database as a tentative list of contact information by inputting personal contact information gained by the inputting person also on inconsistent sender. In this way, the inputting person is also preferably allowed to record and save personal contact information regarding each sender and other information (for example, the story of an acquaintance, physiognomy, etc., as remarks). In this case, a name card, a resume, a two-dimensional bar code, etc. may be captured as images, and input through character recognition function, or electronic information such as an address list, an address book or a phone book stored in the information processing device 21 may be converted by conversion function into a format for the system and input.

Personal contact information on the sender may be copied directly and recorded into the senders' personal contact information database in an embodiment, or the location (link) for saving personal contact information on the sender may be recorded in the senders' personal contact information database in an embodiment. The former case is disadvantageous in terms of recording capacity because there is more than one pieces of the same information, but preferable in that data can be provided instantly when the user requires the senders' personal contact information database. The latter case is advantageous in terms of recording capacity, but in return, requires the adoption of higher-performance computing means.

In addition, the storage medium of the center system 3 may be configured to hold therein only the user ID and asynchronous updates as the senders' personal contact information database, whereas the storage medium on the client system 2 side may be configured to store therein the other contact information database of approved link partners. In this case, when access to the center system 3 is gained through the client system 2, the asynchronous updates will be downloaded to the storage medium of the client system 2. This configuration can reduce the load on the center system 3 side significantly, and built the system with inexpensive equipment. However, the configuration of the storage in the storage medium on the client system 2 side is not suitable for an embodiment in which each user uses more than one information processing device 21 to get access to the center system 3.

Furthermore, when the information or contact information (for example, the name and the e-mail address) for identifying the user for each sender is changed in the case of updating personal contact information on each sender in the senders' personal contact information database, the information or contact information for identifying the user on the sender registered in the sender list is also preferably updated to up-to-date information. It is to be noted that when a user registered as a sender is also registered as a receiver, the information or contact information for identifying the user on the receiver registered in the receiver list may be also updated to up-to-date information in the case of updating the information or contact information for identifying the user.

Figure 19:
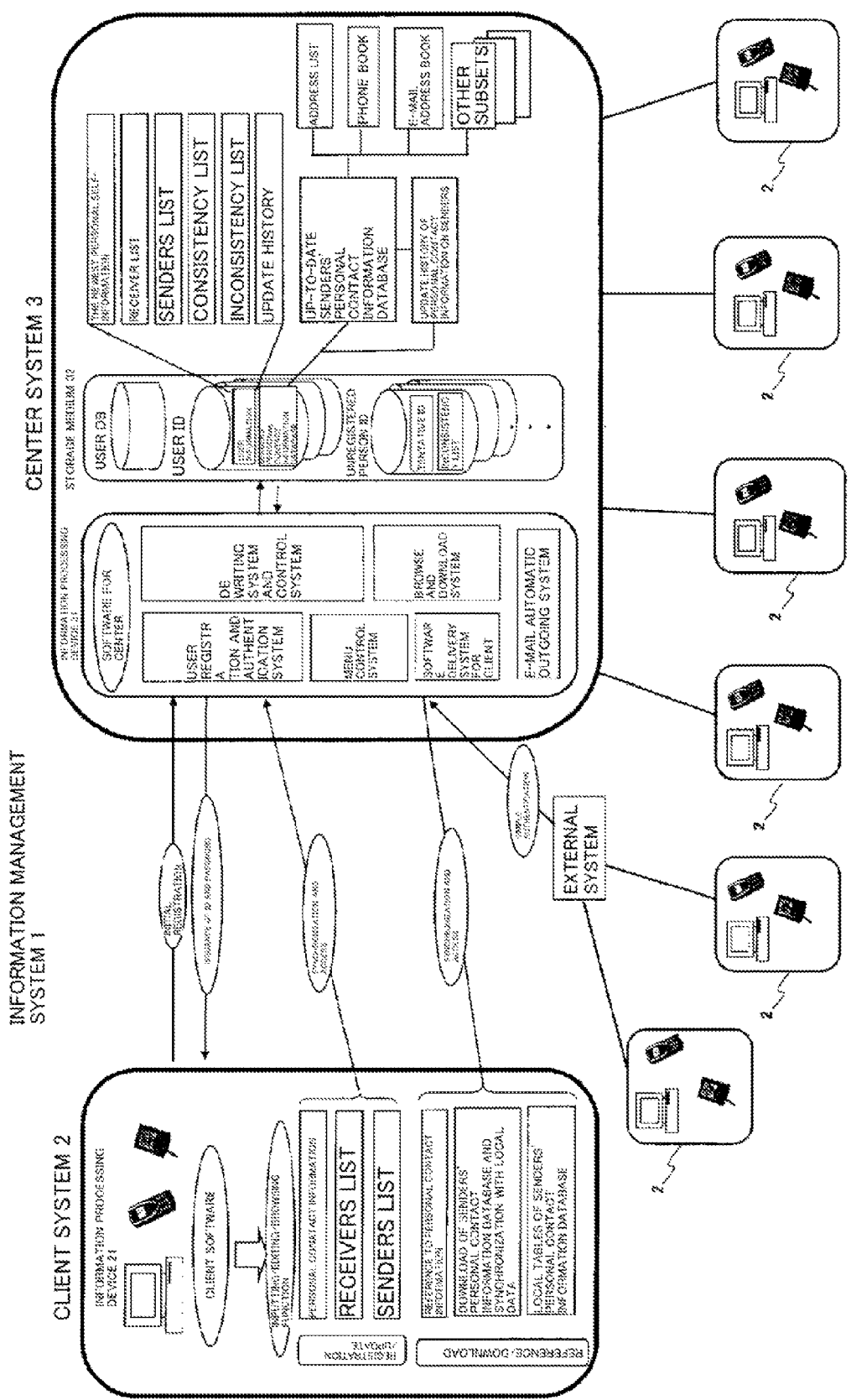
[FIG. 19] A configuration diagram of a person information management system according to the present invention.

FIG. 19 is an example of the configuration diagram of a more specific personal contact information management system 1 according to the present invention. In FIG. 19, a client system 2 includes an information processing device 21, whereas a center system 3 includes an information processing device 31 and a storage medium. The client system 2 executes software for a client to provide inputting, editing and browsing functions to the information processing device 21, so that a user can register and update personal self-information, a receivers list, and a senders list. Furthermore, the client system 2 and the center system 3 are synchronized with and accessed by each other to transmit registered or updated personal contact information, etc. to the center system 3, thereby making it possible to achieve an initial registration, and input or change user own information stored in the storage medium 32 of the center system 3.

In addition, the client system 2 can browse and download user own information stored in the storage medium 32 of the center system 3, and a sender's personal contact information database (abbreviated as DB in the figure). In this case, the senders' personal contact information database may have only required items extracted and output as subsets such as an address list, a phone book, and an e-mail address book. Furthermore, the content of subsets such as an address list, a phone book, and an e-mail address book in the information processing device of the client system 2 can be also synchronized with the center system 3, and thereby updated to the content of an up-to-date sender's personal contact information database stored in the storage medium 32 of the center system 3. In addition, the downloaded senders' personal contact information database can be edited appropriately and expanded to various types of software and applications in the information processing device of the client system 2 or an environment outside the center system 3 (local environment).

More than one client system 2 is connected via a network to the center system 3. An external system may be interposed between the client system 2 and the center system 3. The external system includes at least a user authentication system, and the authentication process can be also simplified for access to the center system 3 in such a way that the process of user authentication for the center system 3 is partially executed in the external system. For example, the external system may be operated in conjunction with a blog system or Social Network Service (SNS), in such a way that personal contact information input as a profile for the blog system or SNS can be input as personal contact information in user information. In addition, the external system may be associated with an e-mail system, in such a way that how to handle an e-mail (reception or rejection of the e-mail, etc.) may be changed by reference to the receiver list and/or the sender list when the e-mail system received the e-mail.

The information processing device 31 of the center system 3 functions as, for example, a user registration and authentication system, a menu control system, a software delivery system for a client, a DB writing and control system, a browse and download system, or an e-mail automatic outgoing system, in accordance with software for the center. The user registration and authentication system is intended to execute, for example, user registration processing or user authentication processing, in such a way that the information and contact information for identifying a user, which is input by the user, is subjected to user registration, or access to the system is attested in the case of consistency in checking against user information of user information. The menu control system is intended to control the display on a display screen of the client system accessing the center system. The software delivery system for a client initially transmits software for a client to the information processing device 21 of the client system 2, for example, in accordance with a request or system login from a user, or exercises the version management of software for a client, which is already loaded on the client system 2 and encourage the user to download the latest version, when required. The DB writing and control system, for example, for a database containing user information for each user and a sender's personal contact information database, stored in the storage medium 32, writes in the database, information input from the user as user information, control checking processing between a receiver and a sender, input the checking result in the database, or rewrites the senders' personal contact information database. The browse and download system displays required items in user information or a sender's personal contact information database stored in the storage medium 32, or downloads the items to the client system 2, for example, in response to a request from the client system 2. The e-mail automatic outgoing system informs, via an e-mail, each user (registered) or an unregistered user that the user is registered by other user on the list as a receiver or a sender to require the approval, for example, when a checking result is inconsistency.

The storage medium 32 of the center system 3 has at least user information and a sender's personal contact information database stored for each user. In addition, a tentative ID and inconsistency list may be stored therein for each unregistered person. Furthermore, a database with only some of user information extracted may be stored therein. For example, a user DB may be provided for accumulating information for identifying a user in user information, and used for user authentication.

Figure 20:
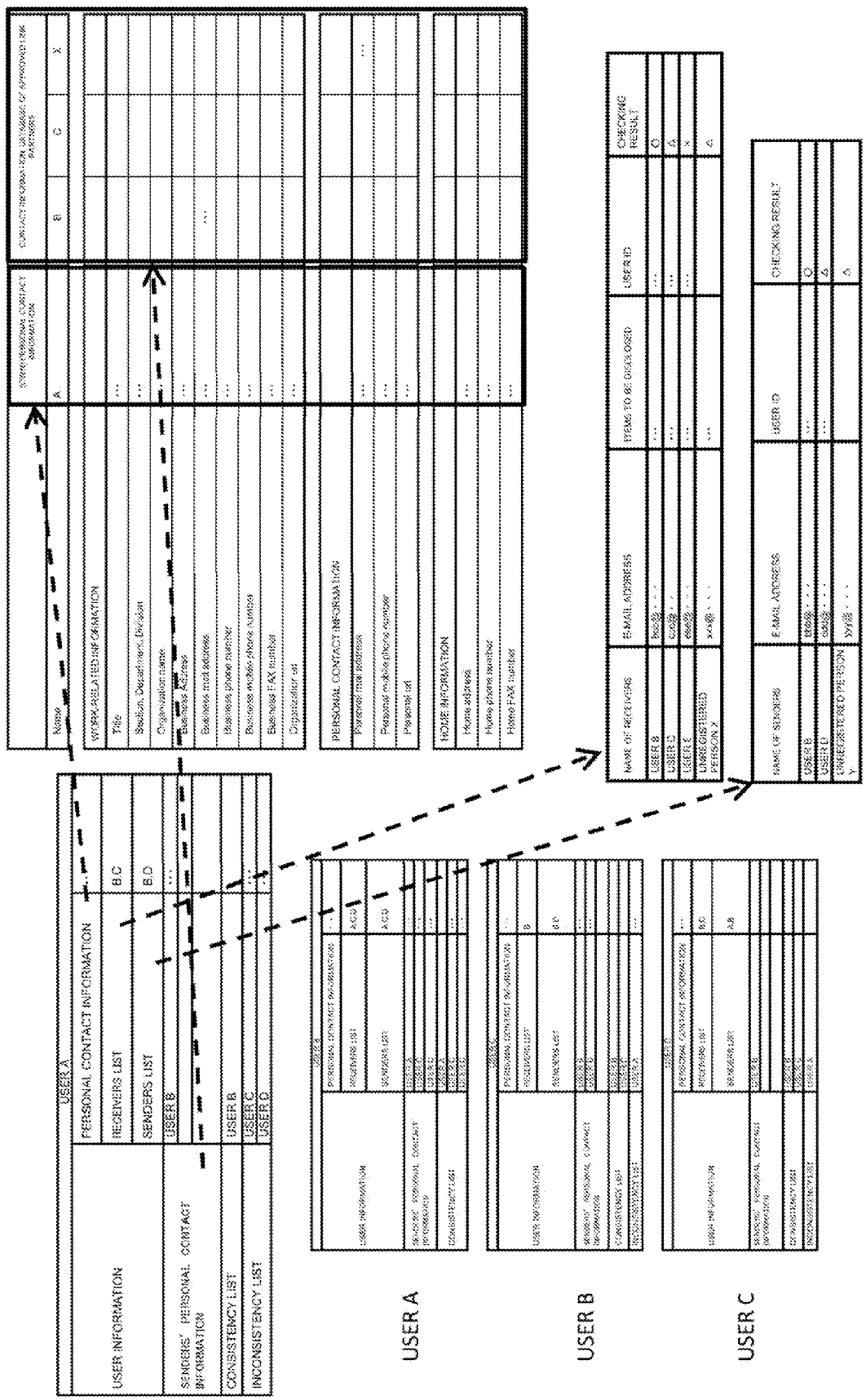
[FIG. 20] A diagram for explaining the correspondence relationship between a data formation and each list.

FIG. 20 is a diagram for explaining the correspondence relationship between the data formation of FIG. 2 and each list of FIGS. 3 through 5. FIG. 20 show therein the data formation of FIG. 2 on the left side, and the item list of personal contact information as shown in FIG. 3, the receiver list shown in FIG. 4, and the sender list shown in FIG. 5, from the top on the right side. As the personal contact information of the user information in the data formation for the user A on the left side in FIG. 20, personal self-information input by the user A is recorded for all or some of the respective items of the personal contact information shown in FIG. 3 on the upper right side of FIG. 20. In addition, as the receiver list of the user information, the receiver name, e-mail address, and items to be disclosed are recorded as shown in the receiver list in the right middle of FIG. 20, and as the sender list of the user information, the sender name and e-mail address are recorded as shown in the sender list on the lower right side of FIG. 20. As the contact information database of approved link partners of the data formation, items set by the sender in the personal contact information on the sender are recorded for all or some of the respective items of the personal contact information shown in FIG. 3 on the upper right side of FIG. 20. While the personal contact information of the user information is distinguished from the contact information database of approved link partners as if as separate information in the data formation, the information can be included in one table like the upper right table in FIG. 20. Furthermore, the consistency list and inconsistency list of the data formation are recorded as checking results in the receiver list in the right middle of FIG. 20 and the sender list on the lower right side thereof.

It is to be noted that the data formation and the specific formation and correspondence relationship for each list are not to be considered limited to those in FIG. 20, and any data formation may be adopted as long as it is possible to retrieve the user information for each user and the senders' personal contact information database.

Each step of information processing in the information processing system will be described below in detail.

Figure 7:
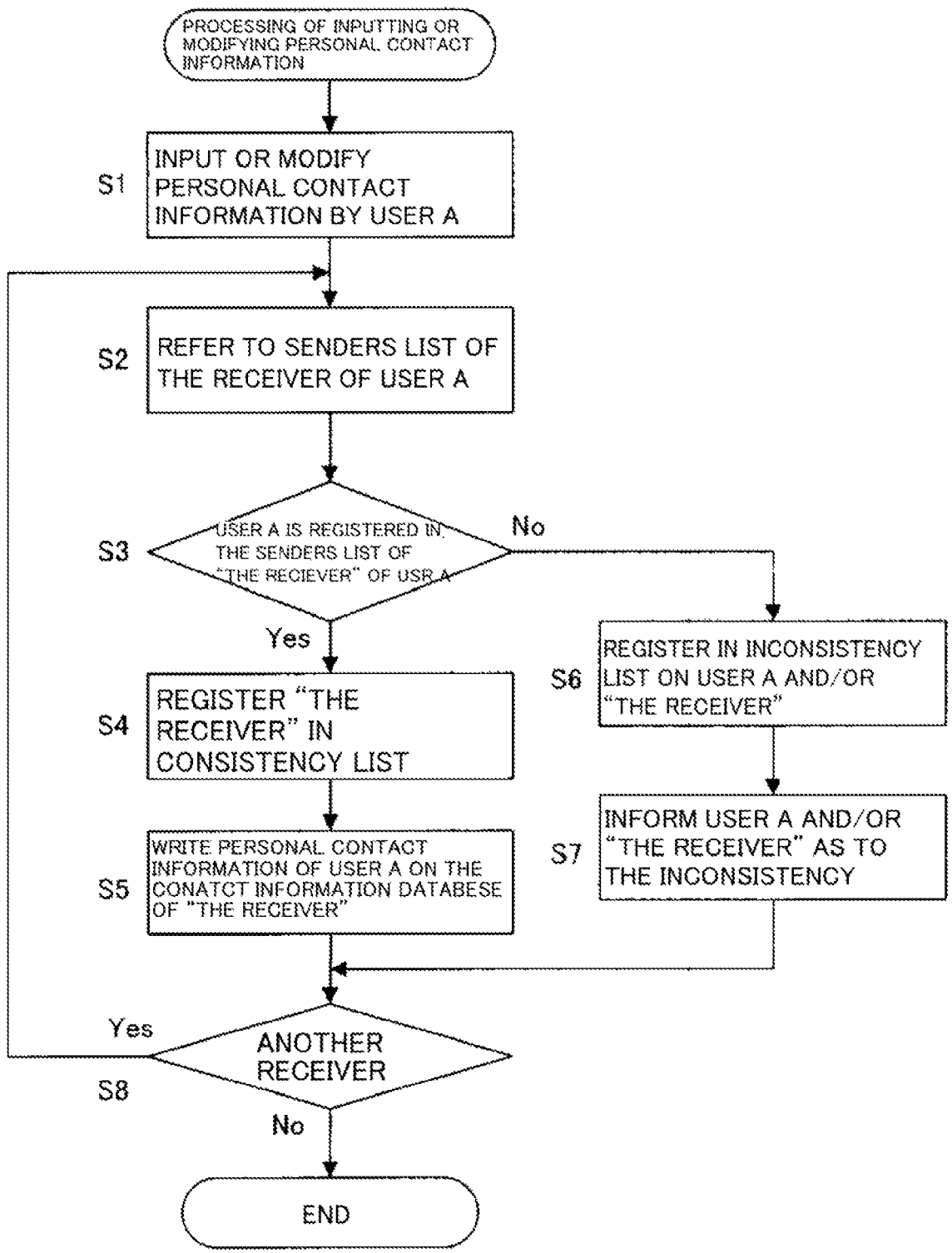
[FIG. 7] An example of a flowchart for processing of inputting or modifying personal contact information.
Figure 21:
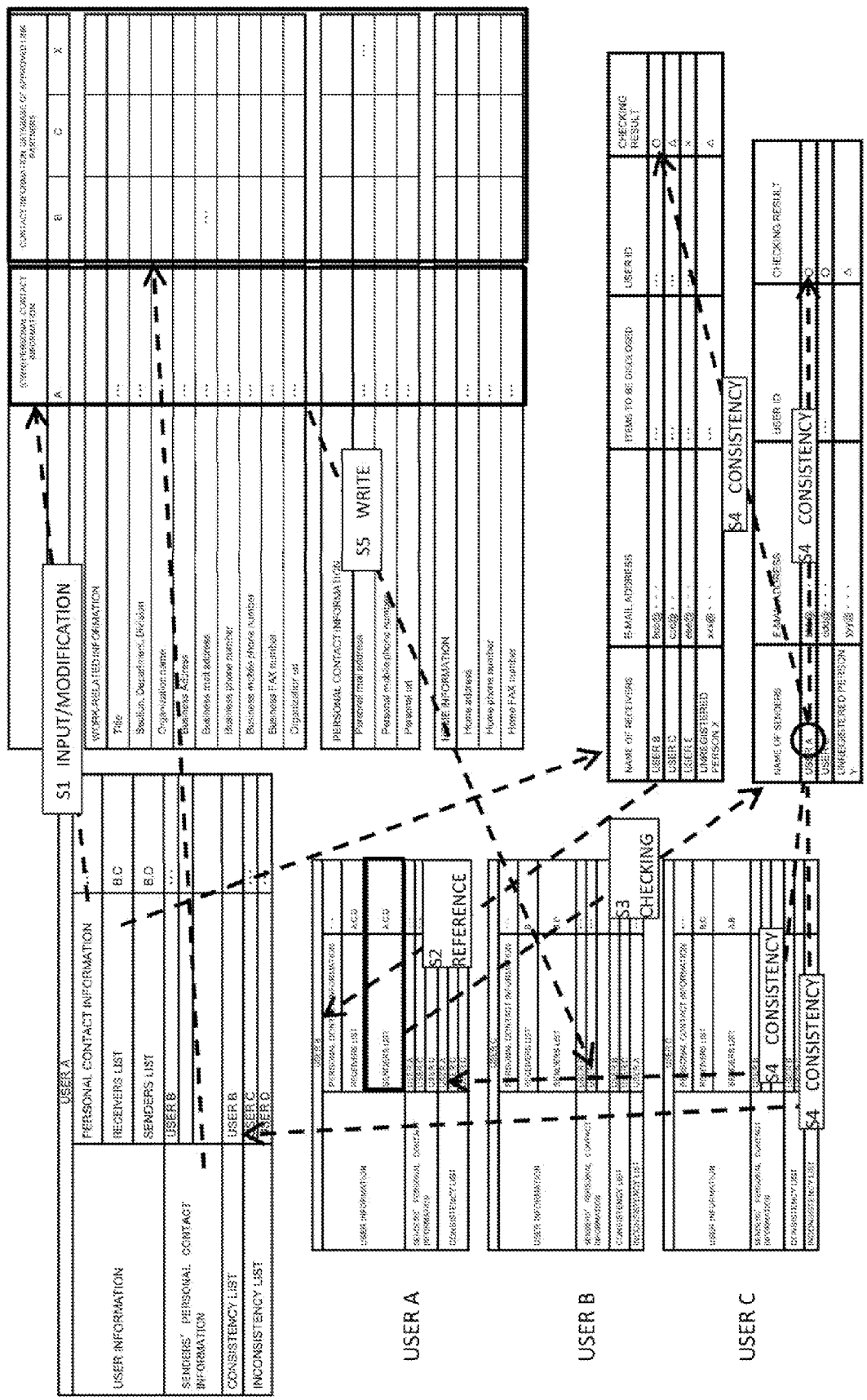
[FIG. 21] A diagram for explaining the correspondence relationship of data on each list in processing of inputting or modifying personal contact information.
Figure 22:
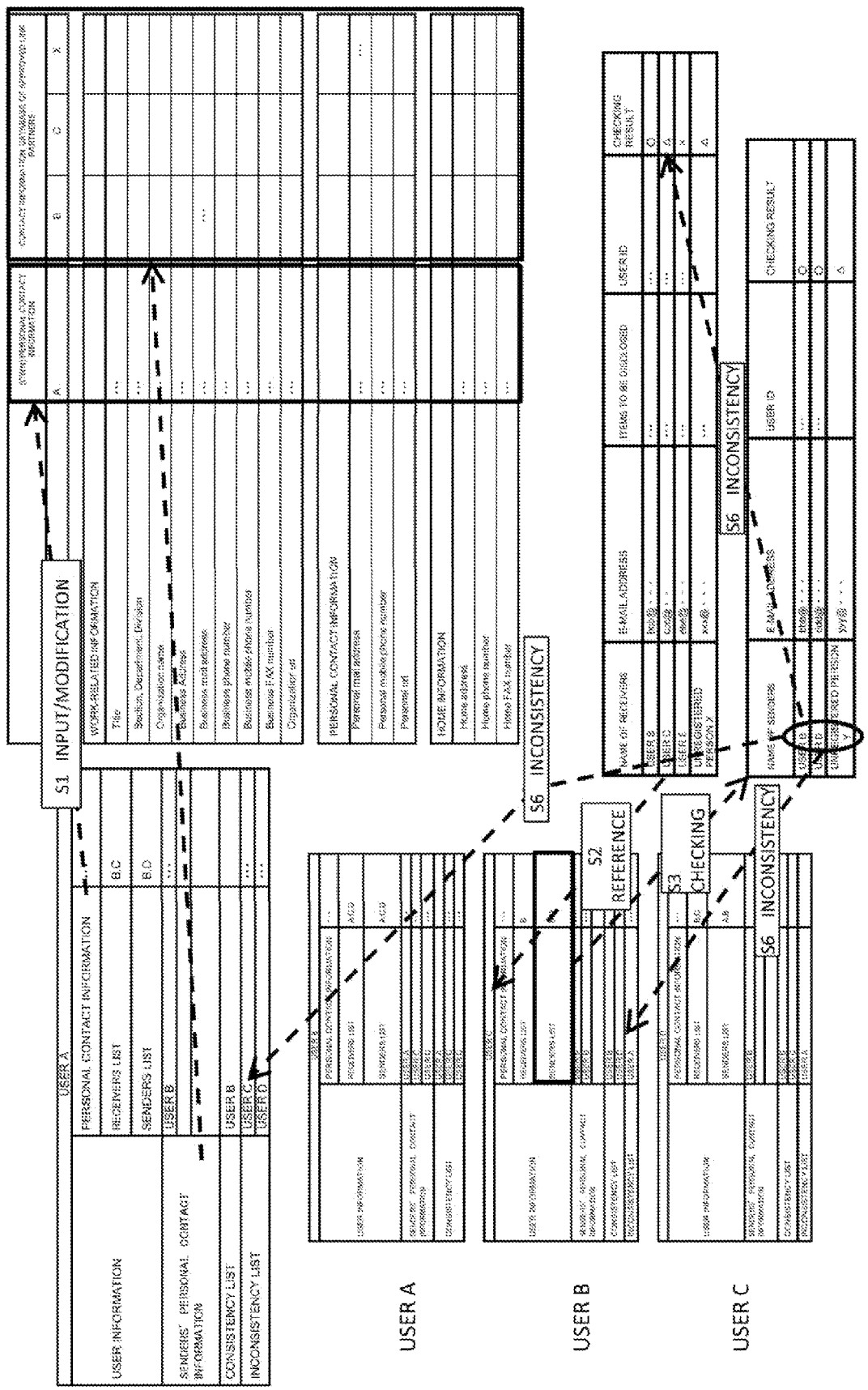
[FIG. 22] A diagram for explaining the correspondence relationship of data on each list in processing of inputting or modifying personal contact information.

(Processing of Inputting or Modifying Personal Contact Information: FIG. 7, FIG. 21, and FIG. 22)

Figure 23:
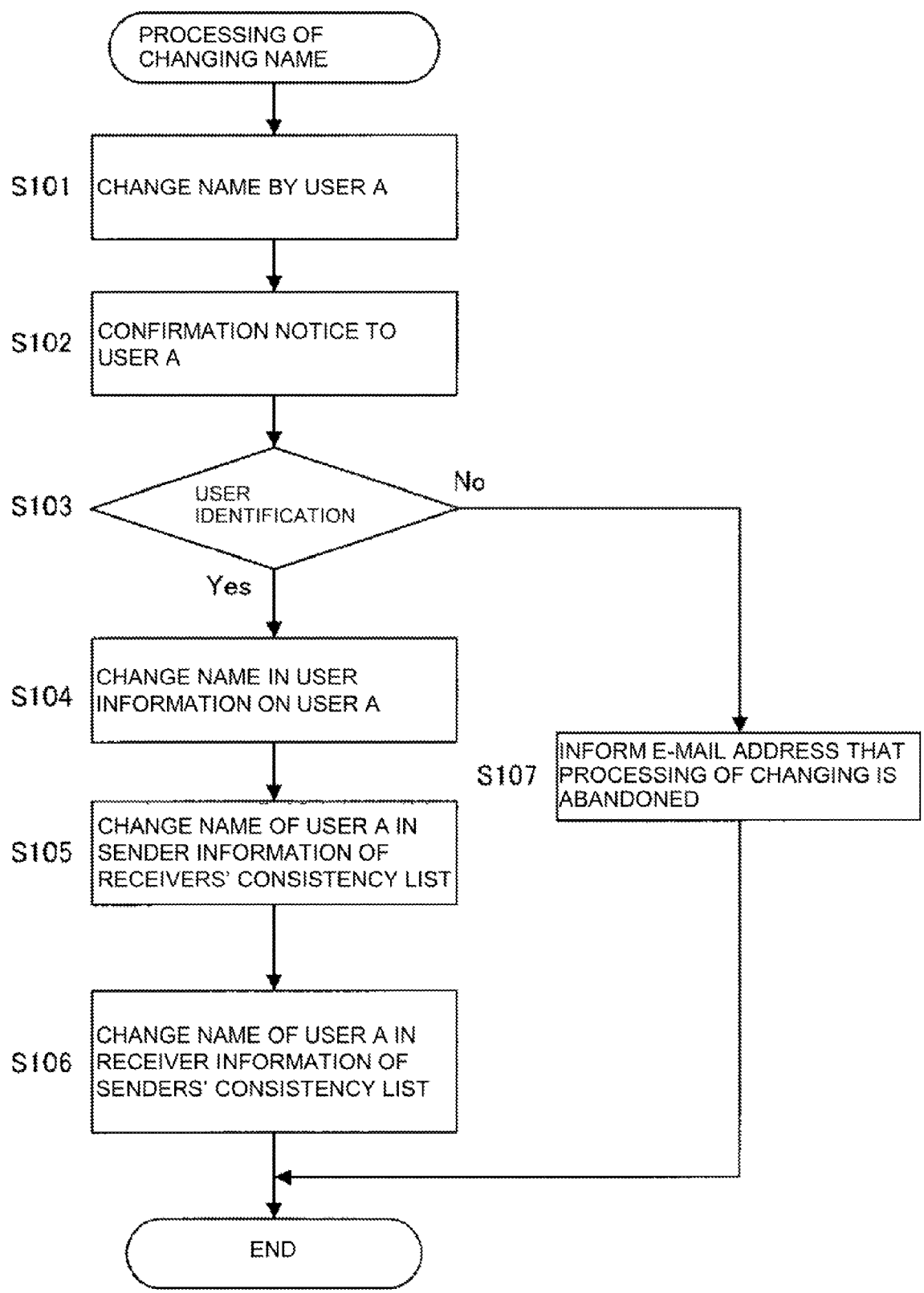
[FIG. 23] An example of a flowchart for processing of changing a user name.

FIG. 7 is an example of a flowchart for processing in the case of inputting or modifying personal contact information, and FIGS. 22 and 23 are diagrams for explaining the correspondence relationship of data on each list, which is input, changed, and referred in accordance with the processing.

When a user A uses the client system 2 to input or change "personal contact information" on the user A (S1), the center system 3 refers to one of receivers registered in a receivers list in user information on the user A as an inputting person (S2), checks whether the user A as an inputting person is registered or not as a sender in a senders list in user information on each receiver (S3), and writes personal contact information on the inputting person A in a sender's personal contact information database on the receiver (S5) only if the user A is registered (Yes for S3 in FIG. 7). Then, the center system 3 confirms whether or not there is any other receiver (S8), and again refers to a senders of personal contact information on a receiver (S2) if there is any other receiver (Yes for S8 in FIG. 7), or ends the processing if there is not any other receiver (No).

For example, in FIGS. 2, 21, and 22, users B and C are registered as receivers in the receiver list on the user A, and a senders list on the user B is first checked (S3). As the result of the checking, the center system 3 writes the input or changed personal contact information on the user A in a sender's personal contact information database on the user B (see S5 and FIG. 21), because the user A is registered as a sender in the sender list on the user B. Next, the center system 3 confirms whether or not there is any other receiver (S8), and again checks a senders list on the user C (S3), because there is the user C as other receiver. As the result of the checking, the center system 3 will not write the personal contact information on the user A in senders' personal contact information database on the user C (see FIG. 22), because the user A is not registered as a sender in the sender list on the user C.

Furthermore, in order to make effective use of the checking result subsequently, the checking result is preferably recorded and reported to the user. For example, as the result of checking the sender list on the user B, the user A is registered as a sender, and the center system 3 thus registers in a consistency list, the user B in the receiver list on the user A or/and the user A in the sender list on the user B (see S4 and FIG. 21). In addition, as the result of checking the sender list on the user C, the user A is not registered as a sender, and it is thus preferable, for example, to register the user C and inconsistent content in an inconsistency list regarding receivers which are able to be browsed by the user A (see S6 and FIG. 22) or/and inform the user A that because no sender is registered, personal contact information on the user A is not transmitted without being written in the senders' personal contact information database on the user C (S7). Furthermore, in order to also inform the user C that a request to send has been made from the user A who is not registered as a sender, it is preferable to register the user A and inconsistent content in an inconsistency list regarding senders on the user C (see S6 and FIG. 22) or/and inform the user C that the request to send has been made from the user A who is not registered as a sender (S7). In the next update of personal contact information, for the receivers on the receiver list, whether or not the user A is registered in the sender list can be confirmed by just referring to the consistency list and the inconsistency list, and the information rewritable receivers can be thus specified quickly, resulting in fast processing. In addition, on the basis of the inconsistency list, the other party with an inconsistent intention can be identified, the other party can be asked for registration in the system via an e-mail, and the other party can be managed from which information is not transmitted.

Figure 8:
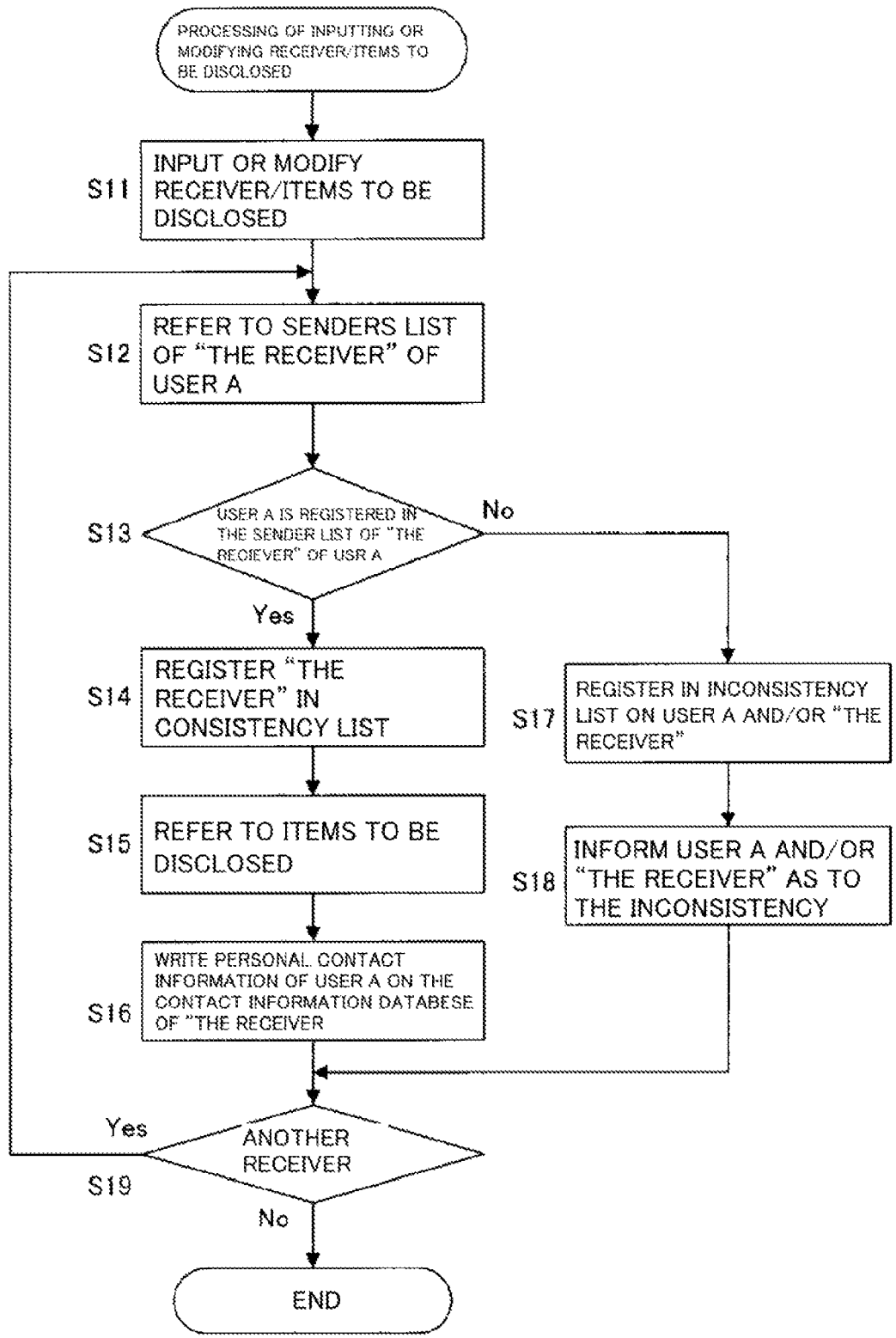
[FIG. 8] An example of a flowchart for processing of inputting or modifying a receiver and items to be disclosed.

(Input Processing for Receiver List: FIG. 8)

FIG. 8 is an example of a flowchart for processing in the case of inputting or modifying a receiver or an item to be disclosed. When the user A uses the client system 2 to input or change "receivers" on the user A or "items to be disclosed" (S11), the center system 3 refers to one of the input or changed "receivers", or one of the receivers on which the "items to be disclosed" are input or changed (S12), checks whether the user A as an inputting person is registered or not as a sender in a senders list in user information on the receiver (S13), and refers to the items to be disclosed and writes personal contact information on the inputting person A in a sender's personal contact information database on the receiver (S16) only if the user A is registered (Yes for S13 in FIG. 8). Then, the center system 3 confirms whether or not there is any other receiver (S19), and again refers to a senders list on a receiver (S12) if there is any other receiver (Yes for S19 in FIG. 8), or ends the processing if there is not any other receiver (No).

For example, when the user A uses the client system 2 to newly register a user D as a receiver in the "receiver list" on the user A in FIG. 2, the center system 3 refers to input user information on the user D S12), and checks whether or not the user A as an inputting person is registered as a sender in a senders list on the user D (S13). The center system 3 writes the personal contact information on the user A in a sender's personal contact information database on the user D (S16), because the user A is registered in the sender list on the user D. In addition, as described above, as the result of the checking, the user is preferably registered in a consistency list (S14) if the user is registered as a sender, or registered in an inconsistency list (S17) and reported to each other (S18) if the user is not registered. Furthermore, when the user D is registered in the inconsistency list on the user A, or when the user A is registered in the inconsistency list on the user D, the center system 3 deletes the user from the inconsistency list.

It is to be noted that a receiver can be also registered in a receivers list on the basis of the inconsistency list described above. For example, if the user D refers to the inconsistency list and registers, in the receiver list, the user A registered in the inconsistency list, the user A can be registered in the consistency list without referring to the user information on the user A, because the transmitting intention of the user A has been confirmed already. Alternatively, the user may be registered in a rejection list rather than being registered in the receiver list. In these cases, the other party with an inconsistent intention can be identified according to the inconsistency list, and preferably, the mere selection of matching or rejecting for the registrant on the inconsistency list can update the management of personal contact information to a more appropriate state.

Figure 9:
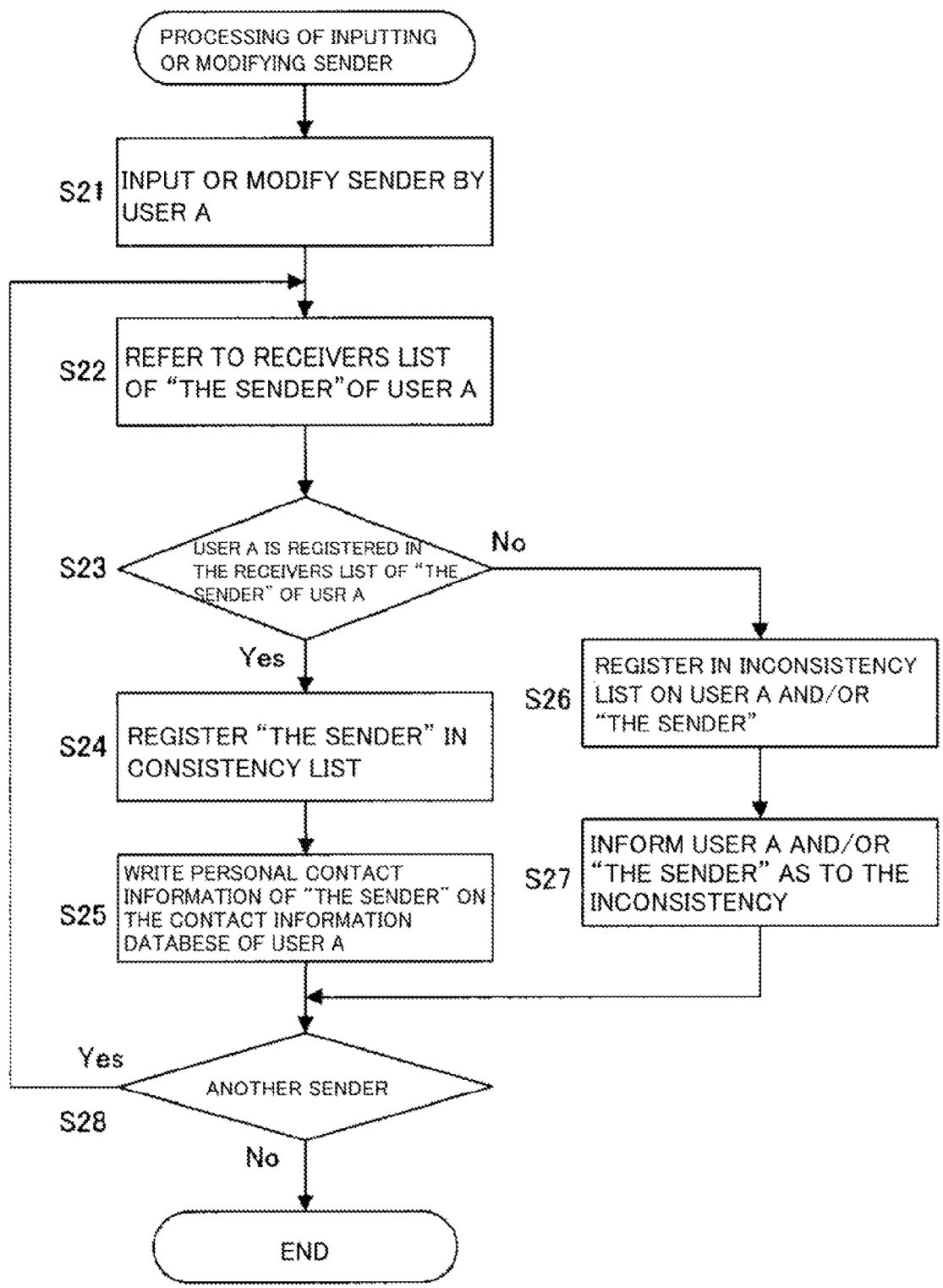
[FIG. 9] An example of a flowchart for processing of inputting or modifying a sender.

(Input Processing for Sender List: FIG. 9)

FIG. 9 is an example of a flowchart for processing in the case of inputting or modifying a sender. When a user A uses the client system 2 to input or change "senders" on the user A (S21), the center system 3 refers to one of the input or changed senders (S22), checks whether the user A as an inputting person is registered or not as a receiver in a receivers list in user information on the sender (S23), and writes personal contact information on the sender in a sender's personal contact information database on the user A (S25) only if the user A is registered (Yes for S23 in FIG. 9). Then, the center system 3 confirms whether or not there is any other sender (S28), and again refers to a receivers list on the next sender (S22) if there is any other sender (Yes for S28 in FIG. 9), or ends the processing if there is not any other sender (No).

For example, in FIG. 2, users B and D are registered for senders on the user A, and reference will be first made to a receivers list on the user B (S23). As the result of checking, the user A is registered as a receiver in the receiver list on the user B, and the center system 3 thus writes personal contact information on the user B in the senders' personal contact information database on the user A (S25). Next, referring to a receivers list on the user D (S23), the user A is not registered as a receiver, and the center system 3 will thus not write personal contact information on the user D in the senders' personal contact information database on the user A. For this reason, while not only the user B but also the user D are registered in the sender list on the user A in FIG. 2, personal contact information on the user B is recorded in the senders' personal contact information database whereas personal contact information on the user D is not recorded, because the user A is not registered in the receiver list in the user information on the user D. It is to be noted that while the personal contact information in the user information is not written when the senders' personal contact information database is of sender registration type, information (name and ID) for identifying the user D input as a sender by user A and contact information (e-mail address) are written in the senders' personal contact information database on the user A. Furthermore, information regarding the user D, which is input by the user A, may be also able to be written in the senders' personal contact information database on the user A.

Furthermore, as described above, in order to make effective use of the checking result subsequently, the checking result is preferably recorded and reported. As the result of the checking, the user is preferably registered in a consistency list (S24) if the user is registered as a receiver, or registered in an inconsistency list (S26) and reported to each other (S27) if the user is not registered. For example, as the result of checking the transmission sender list on the user B, the user A is registered as a receiver, and the center system 3 thus registers in a consistency list, the user B in the sender list on the user A or/and the user A in the receiver list on the user B (S24).

In addition, as the result of checking the transmission sender list on the user D, the user A is not registered as a receiver, and thus, for example, the user D is registered in an inconsistency list which are able to be browsed by the user A, or/and the user A is informed that "personal contact information on the user D is not obtained because no receiver is registered" (S26, 27). Furthermore, in order to also inform the user D that a request to send has been made from the user A who is not registered as a receiver, it is preferable to register the user A in an inconsistency list on the user D or/and inform the user D that "the request to send has been made from the user A who is not registered as a receiver" (S26, 27). In the next input of the sender list, and in the update of personal contact information on the senders, for the senders on the sender list, whether or not the user A is registered in the sender list can be confirmed by just referring to the consistency list and the inconsistency list, and the information rewritable receivers can be thus specified quickly, resulting in fast processing.

While the basic processing in the personal contact information management system 1 has been described above, the registration of a receiver in a receivers list by the inputting person A means an intention of the input person A: "permitting the disclosure of personal self-information to the receiver (for example, users B and C, unregistered persons X and Y)", whereas the registration of a sender in a senders list by the inputting person A means an intention of the input person A: "permitting personal contact information from the sender (for example, users B and D, unregistered persons X and Z) to be received to modify the content of the senders' personal contact information database on the inputting person A" in the personal contact information management system 1. Further, the personal contact information management system 1 is a system which allows the operation of the user A as an inputting person to modify a sender's personal contact information database on the user B as other person, although the modification is limited to a case in which an information disclosure intention of a user is consistent with an information modification intention of other user.

Furthermore, the result of checking an intention of disclosing information against an intention of receiving and rewriting information is preferably stored as checking result information in the personal contact information management system 1. More specifically, if the intention of disclosing information is consistent with the intention of receiving and rewriting information, the relationship is registered in a consistency list, and if not, the relationship is registered in an inconsistency list. The inconsistency refers to a state in which to one intention, the other intention is not made, ant then, the permission of the other provides a consistent state to disclose and rewrite information, whereas the rejection of the other provides a rejection state. As for the rejection state, several embodiments are conceivable in terms of effect, and for example, the system can be also adapted so that not only the disclosure and rewriting of information but also the notification of inconsistency, etc. are not permitted between the both, unless the rejecting user carries out a release operation afterward. It is to be noted that when a receiver is deleted from a receivers list, or when a sender is deleted from a senders list, the relationship with the receiver or the sender will be brought into a rejection state, in which the disclosure or rewriting of information is not carried out.

In general, other's free browsing, copying, or modification of information recorded on a personal recording area involves risk such as leak and diffusion of information and falsification of the content. However, in this system, the registration in the receiver list and the sender list permits an intention of information disclosure or information modification, and the disclosure of information and the automatic modification of information under the condition of consistency with a corresponding intention of the other party. In this personal contact information management system 1, one or more of the following advantageous effects can be achieved by inputting personal contact information, the receiver list, and the sender list as the user information.

First, each user can centralize and manage personal self-information. More specifically, if personal contact information in this personal contact information management system 1 is updated to up-to-date information, the up-to-date personal self-information can be gained by referring to or downloading the personal self-information registered in this personal contact information management system 1, when the input of the personal self-information is required in individual applications (for example, name card creating software and postcard creating software) and more than one information processing device (home personal computers, cellular phones, company personal computers, etc.).

Secondly, each user can manage receivers in a lump by registering, in a receivers list, receivers to which at least some of personal self-information is permitted to be disclosed. Furthermore, the consistency with a receiving intention of a receiver (registration in a sender) can provide updated information in a lump to the other party (receiver) requiring the update of personal self-information, and also allows a sender's personal contact information database on each receiver to be rewritten automatically. For this reason, each user can manage the senders' personal contact information database to up-to-date information for each receiver registered in the receiver list. In addition, the items of personal contact information to be transmitted (transmission content) for each receiver can be also managed by setting items to be disclosed for each receiver.

Thirdly, each user can manage senders in a lump by registering, in a senders list, senders permitted to receive personal contact information on other person when the personal contact information is transmitted. Furthermore, the consistency with an intention of a sender to disclose personal contact information (registration in a receiver) can manage, as a sender's personal contact information database, personal contact information on the other person (sender) automatically to the up-to-date information.

Furthermore, each user has two types of lists, the receiver list and the sender list, and thus allows the one-way disclosure of personal contact information. More specifically, it is possible for the same person to be registered in the receiver list rather than in the sender list, or to be registered in the sender list rather than in the receiver list. In this case, even if the other part mutually discloses personal self-information and desires the update of a sender's personal contact information database on the other party (two-way relationship), only the relationship of any one-way disclosure and corresponding update is established. In a so-called network society, various types of information are proliferating, it is impossible to gain all of the types of information, and an emphasis is rather placed on the extraction of required information from countless pieces of information. In this regard, the same applies to the personal contact information, and the receiver registered as a target to which personal self-information is disclosed is not necessarily consistent with the sender registered as a target for a sender's personal contact information database. It is not always evitable for a user who registers a lot of receivers to manage the same number of senders and senders' personal contact information databases as the number of receivers. This personal contact information management system 1 can achieve one-way relationships as described above, and thus provide appropriate embodiments of information management in response to diversifying human relationships. It is to be noted that if the both parties are registered as both a receiver and a sender, a two-way relationship can be built.

In addition, the storage of the checking result information can, in addition to the advantageous effect of ability to increase the checking speed, manage receivers that succeed in updating personal contact information and receivers that fail to update personal contact information, and manage senders that succeed in receiving personal contact information and senders that fail to receive personal contact information, and further figure out whether or not the receivers or senders are interested in self.

The personal contact information management system 1 will be described below which uses programs according to the present invention to achieve more complex functions, including auxiliary processing and selectively adoptable processing in the personal contact information management system 1.

(Registration Processing)

Figure 10:
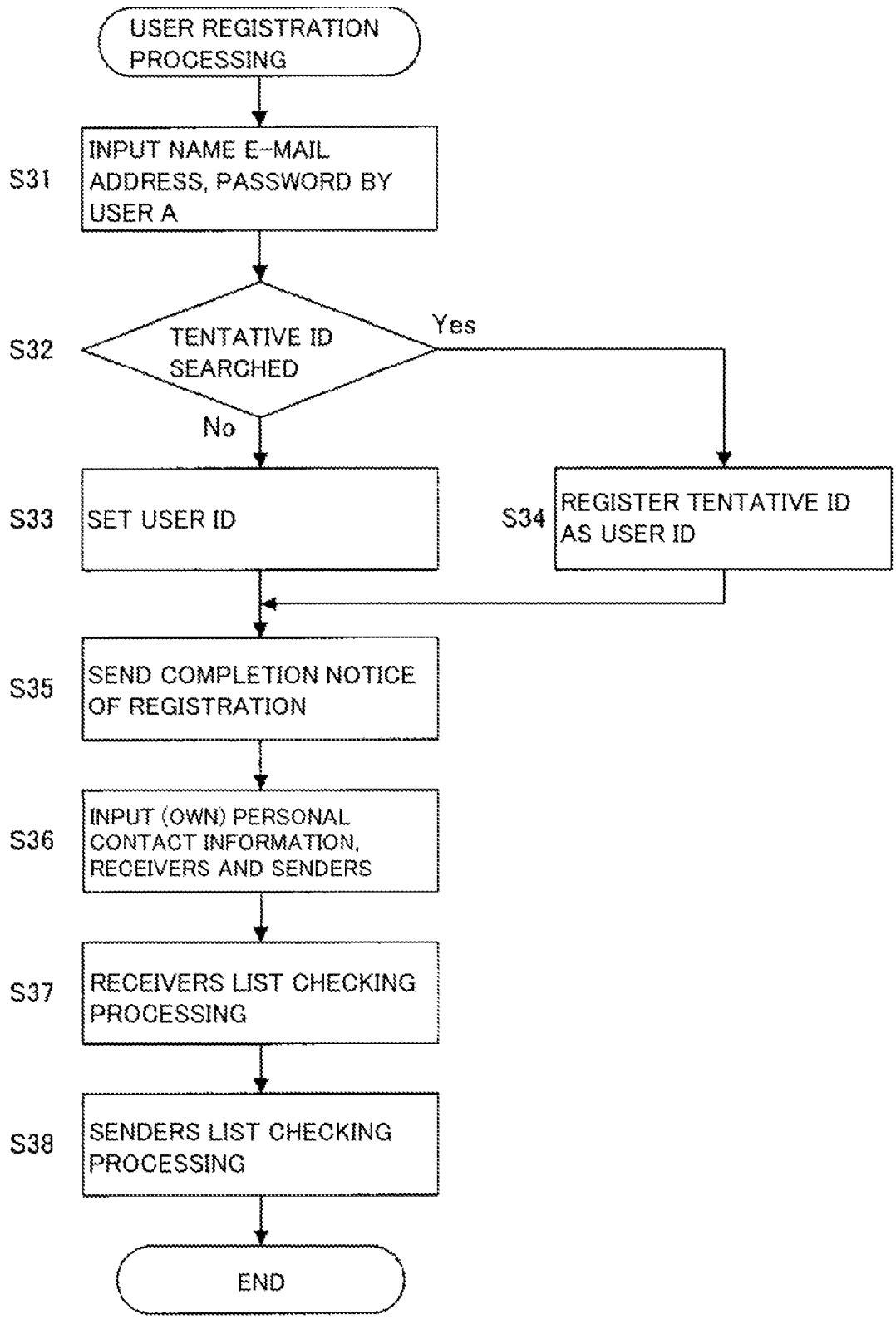
[FIG. 10] An example of a flowchart for user registration processing.

First, in the case of using the system for the first time, user registration processing is executed. FIG. 10 is an example of a flowchart for the user registration processing. User A uses a network to access to the center system 3 from the information processing device 21 partially constituting the client system 2 (S31), and inputs at least more than one piece of information for identifying the user A and contact information. The information for identifying the user includes a user ID, a user name, and an e-mail address, whereas the contact information includes an e-mail address, a phone number, and an address. In FIG. 10, the user name, the e-mail address, and a password are input. Although not shown in FIG. 10, in order to prevent double registration due to the same information for identifying the user, it is preferable to provide a step of checking the combination of the input user name and e-mail address against the user name and e-mail address in registered user information, and if matched, informing that the user name and e-mail address are registered already. It is to be noted that when the user ID is input as the information for identifying the user A in the input process in S31, then the user ID is checked against the user ID in already registered user information, and if matched, a step is required in which the user A is informed that the same user ID is registered already, and instructed to input another user ID. However, this effect is not intended to preclude the registration of one individual as more than one user. While this information management system is a system which is also able to be used by one user in common for work and for private, the change of the e-mail address allows registration as another user, and it is also possible to register a user for work and a user for private independently. However, the system may be configured so that more than one registration is not permitted with the same e-mail address as a general rule, because the e-mail address is like nothing else. In this case, only the e-mail address is checked against the already registered e-mail address, rather than the combination of the user name and e-mail address, and if matched, it is preferable to provide a step of informing that the e-mail address is registered already.

In addition, the identification of the individual and the security can be enhanced by inputting a password in the registration. The password may be set by the user in the registration, or the name and e-mail address may be input to effect interim registration so that the input e-mail address is informed of a password issued by the center system 3.

Furthermore, some or all of the other user information may be input in the registration. Of course, while the user information can be added and modified afterward, at least personal self-information is preferably input in the registration.

Next, the center system 3 searches a tentative ID with the use of the input user name or/and e-mail address (S32) in order to search whether or not the inputting person A is registered as an unregistered person by an existing user in a receivers list or a senders list. The tentative ID is, as described later, issued when the user is input as a receiver or a sender, but not stored in user identifying information of user information, to store contact information, etc, input as a receiver or a sender in connection with the tentative ID. If the user A is a new user who is not registered on the tentative ID (No for S32), the center system 3 sets a new user ID (S33). If the user A is consistent with the name and e-mail address of the tentative ID (Yes for S32), the content of the tentative ID is directly registered as, or modified and registered as a user ID (S34). Then, the center system 3 sends a notice of registration completed in the system to the e-mail address input by the user A (S35). The user A is allowed to input user information (personal self-information, a receivers list, and a reception list) via the client system 2 (S36: see FIGS. 2 to 6), and the center system 3 stores the user information in the storage medium 32. On the basis of the receiver list of the input user information, receiver list checking processing is executed for updating contact information database of approved link partners on a receiver with a consistent intention (S37: see FIGS. 7 and 8). Furthermore, on the basis of the sender list of the input user information, sender list checking processing is executed for registering personal contact information on a sender with a consistent intention in contact information database of approved link partners on the user A (S38: see FIG. 9). It is to be noted that the registration processing may be completed at the stage of S35 to execute processing of inputting the rest of the user information (S36) and subsequent processing at a time convenient to the user, or may be considered as an interim registration at the stage of S35 and considered as an official registration at the stage of predetermined user information input by the user in S36. Furthermore, the inputting person may be requested to submit a form of identification in the middle of the system registration. For example, the inputting person may be requested to send a copy of an electronic certificate, a Basic Resident Register card, a driver license, an insurance card, a student identification card, or the like.

(Processing Involving Unregistered Persons)

When the user A inputs a receiver and a sender, the input can be preferably also intended for registrants who have not been registered in the system yet, and further as a result, leading to an increase in the number of registrants in the system. For this purpose, when an unregistered person is input as a receiver or a sender, a tentative ID is issued, and the unregistered person is regarded as a tentative user and incorporated in the system. It is to be noted that the tentative ID is the same as normal user IDs in terms of function of identifying a user, and may thus have a symbol assigned thereto in accordance with the same symbol system as for the user IDs. However, since the tentative ID is not an ID registered by oneself in the system, tentative IDs will be also issued due to inconsistent intentions as a result of checking and errors in the input of receivers or senders, thereby leading to an increase in the number of IDs. Thus, it is preferable to assign symbols in accordance with a different symbol system from as for user IDs. For example, a system of sequentially assigning combinations of six alphanumeric characters is adopted as the symbol system for normal user IDs, whereas a system of sequentially assigning combinations of seven alphanumeric characters is adopted as the symbol system for tentative IDs, or specific strings of characters are added to tentative IDs, thereby allowing the user IDs and the tentative IDs from each other. As described above, when the user ID is distinguished from the tentative ID, the receiver or sender with a consistent intention can be specified more quickly if whether or not there is any receiver or sender is searched for the tentative ID after first searching whether or not there is any receiver or sender for the user ID. More specifically, if the input receiver or sender is located in the tentative ID, the intention will not be consistent, and the consistent receiver or sender can be thus specified by searching only among user IDs except for tentative IDs.

Figure 11:
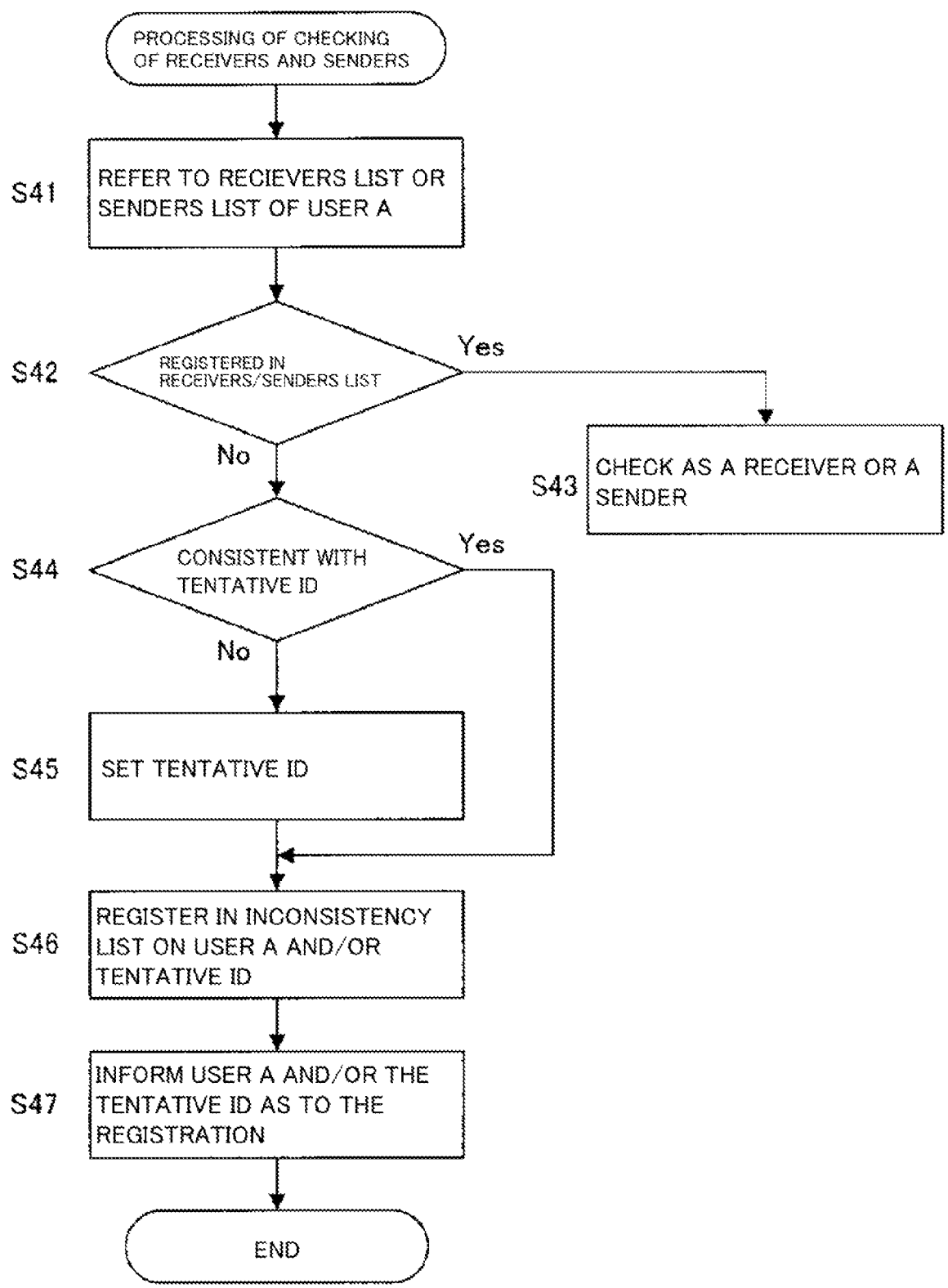
[FIG. 11] An example of a flowchart for processing of checking, which involves unregistered persons.

FIG. 11 is an example of a flowchart for processing of checking a receiver or a sender (including processing of issuing a tentative ID) in the system including unregistered persons. The processing of issuing a tentative ID is executed in the case of referring to checking a receiver or a sender, and for example, executed in step 2 of FIG. 7, step 12 of FIG. 8, and step 22 of FIG. 9. First, through reference to a receiver or a sender (S41 (corresponding to the processing in S2, S12, or S22)), it is checked whether or not the receiver or sender is consistent with user identifying information and contact information in personal contact information of each user information stored in the storage medium 32 (S42), and if there is any consistency, the consistent user is recognized as a receiver or a sender, and a senders list or a receivers list on the receiver or sender is checked (S43 (corresponding to the processing in S3, S13, or S23)). It is to be noted that in S42, previous history may be saved as personal contact information of each user information to make a search for information, including previous personal contact information on each user, which is saved as history. If any user is not registered who is completely consistent with the personal contact information of the user information, then, it is checked whether or not the receiver or sender is consistent with the user identifying information and contact information on tentative IDs (S44), and if there is any consistency, the user A and inconsistent content are registered in a inconsistency list on the consistent tentative ID (S46). Alternatively, if any consistent tentative ID is not registered, the receiver or sender is regarded as an unregistered person who has not been registered yet, a tentative ID is set, and the user identifying information and contact information input as a receiver or a sender are stored as personal contact information of user information on the tentative ID (S45). Furthermore, the user A and inconsistent content are registered in an inconsistency list on the consistent tentative ID (S46). It is to be noted that the receiver or sender and the inconsistent content may be registered in an inconsistency list on the user A in step S46. In addition, it is preferable to provide a notice of encouraging registration in the system and a notice of desiring to transmit personal contact information to the contact information on the tentative ID (S47).

For example, when a user X is registered as a receiver in a receivers list on the user A in FIG. 12, it is checked whether or not the combination of user identifying information (a name, a user ID) and contact information (an e-mail address) on the user X is located in personal contact information in user information for each user (S42). The user X is an unregistered person, and thus not located in the personal contact information in the user information. Therefore, the center system 3 searches whether or not the combination is located in the tentative ID (S44). If the combination of the same user identifying information and contact information is located in the tentative ID, the user A is registered in an inconsistency list on the tentative ID (S46). Alternatively, if the combination is not located even in the tentative ID, a tentative ID is set (S45), and the user A is registered in an inconsistency list on the tentative ID (S46). Then, a notice of encouraging registration in the system and a notice of desiring to transmit personal contact information are provided to the e-mail address of the user X (S47). The same applies to a user X on a senders list on the user A in FIG. 12.

Figure 13:
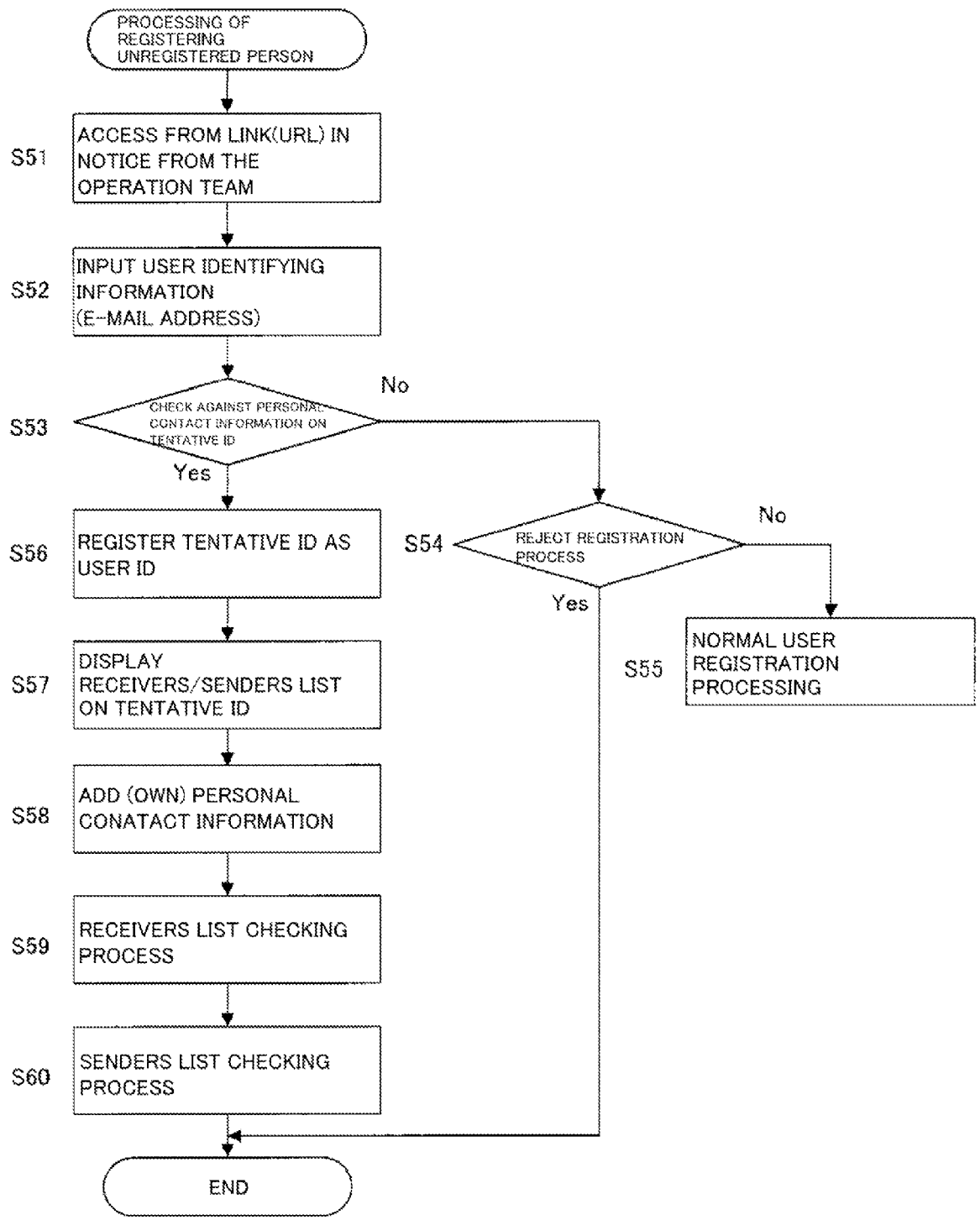
[FIG. 13] An example of a flowchart for processing of registering an unregistered person.

FIG. 13 is an example of a flowchart for registration processing in the case of user registration from a notice to an unregistered person (user X). The notice (S47) to the contact information of the unregistered person has a link (web address) to the system, and through access of the user X from the link, an entry screen for user identifying information (name) is displayed via the client system 2, and the user X is allowed to input self-identifying information (name) (S52). The center system 3 checks the self-identifying information (name) input by the user X against identifying information stored as user identifying information on the tentative ID (S53). If the input identifying information (name) is not consistent with the user identifying information on the tentative information (FIG. 13, No for S53), the user X is allowed to select whether or not the registration processing is ended (S54). In the case of ending the registration processing, the processing is directly ended. On the other hand, when the registration processing is not ended, the processing moves into normal user registration processing (S55: FIG. 10). If the input identifying information (name) is consistent with the user identifying information on the tentative ID (FIG. 13, Yes for S53), the content of the tentative ID, for example, the tentative ID number, and the user identifying information and inconsistency list on the tentative ID is directly registered as, or modified and registered as a user ID (S56). The use of the content of the tentative ID can skip a part of the input operation of a user in the registration. As described above, it can be confirmed that the reported party (user X) is the same person as the input as a receiver or a sender, by allowing the user X to input the user identifying information in step S52. In this case, the notice to the user X contains no user identifying information on the tentative ID. However, the notice to the user X may contain the user identifying information on the user A input as a receiver or a sender.

Then, the user identifying information, contact information, and inconsistency list stored in connection with the tentative ID are displayed (S57), and user information is added (S58), if necessary. Then, the center system 3 executes processing of checking a receivers list (S59) and processing of checking a senders list (S60). Basically, as described in S38 (see FIG. 9) of FIGS. 10 and S37 (see FIGS. 7 and 8) in FIG. 10, the processing of checking is intended for checking against user information on a receiver and a sender. However, in the case of registering, as a receiver and a sender, the user registered in the inconsistency list stored in connection with the tentative ID, it is not necessary to purposely access user information for each user, because the intention of the other party is already clear.

(Processing Using Checking Result Information)

As described already, the result of checking an intention of disclosing information against an intention of receiving and rewriting information is preferably stored as consistency list, inconsistency list, and rejection list choking result information. The checking result information is preferably registered so as to be distinguishable between information regarding receivers and information regarding senders, and used for processing of checking and processing of inputting a receiver or a sender.

The inconsistent state includes two types of: a state with registration as a receiver by an inputting person but without registration as a sender by the other party (first state) and a state with registration as a sender by an inputting person but without registration as a receiver by the other party (second state), but includes four types in total because the inputting person in a different position from the other party. More specifically, the first state refers to a state (hereinafter, "unsent") of, to the inputting person, failing to succeed in transmission in spite of registration as a receiver, but a state (hereinafter, "unregistered sender") of, to the other party, failing to succeed in reception because of no registration as a sender. In addition, the second state refers to a state (hereinafter, "unreceived") of, to the inputting person, failing to succeed in reception in spite of registration as a sender, but a state (hereinafter, "unregistered receiver") of, to the other party, failing to succeed in transmission because of no registration as a receiver. The states of unsent and unregistered receiver mean inconsistency regarding a receiver, whereas the states of unreceived and unregistered sender mean inconsistency regarding a sender.

Figure 14:
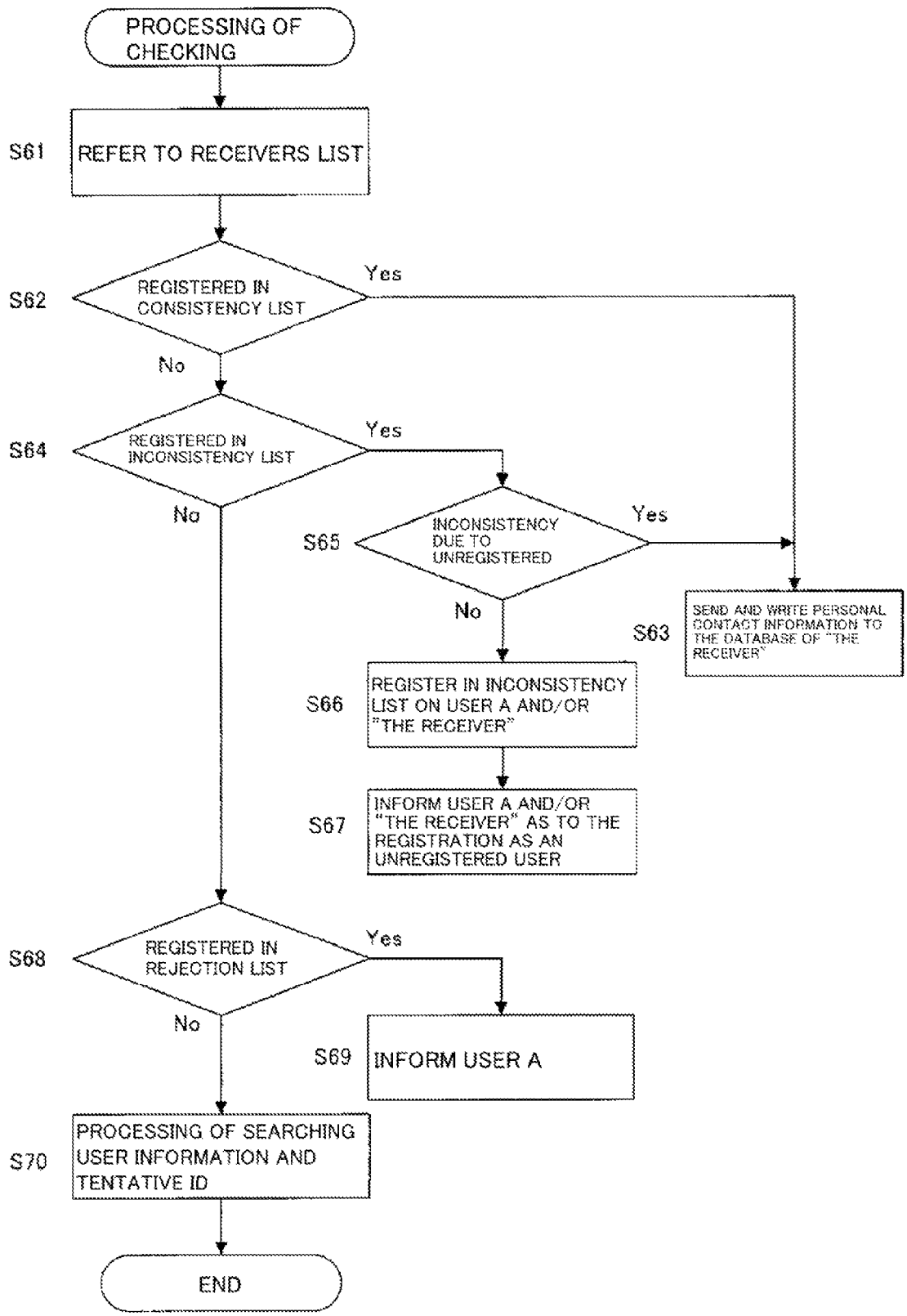
[FIG. 14] An example of a flowchart for processing of checking a receiver, with the use of checking result information.

FIG. 14 is an example of a flowchart for a section of using checking result information in processing of checking a receiver. The flowchart in FIG. 14 is executed, for example, before S3 of FIG. 7, S13 of FIG. 8, or S42 of FIG. 11. First, through reference to a receiver (S61 (corresponding to S2, S12, and S41)), it is researched whether or not the receiver is registered in a consistency list regarding receivers on user A (S62), and if the receiver is registered in the consistency list (Yes for S62 in FIG. 14), personal contact information is transmitted without referring to any user information on the receiver (S63). If the receiver is not registered therein (No for S62 in FIG. 14), it is researched whether or not the receiver is registered in an inconsistency list regarding receivers on user A (S64), and if the receiver is registered in the inconsistency list (Yes for S64 in FIG. 14), it is determined whether or not the inconsistent content is an unregistered receiver (S65). If the inconsistent content is an unregistered receiver (Yes for S65 in FIG. 14), personal contact information is transmitted without referring to any user information on the receiver (S63) because the permitting intention of the other party has been made already, whereas if the inconsistent content is not an unregistered receiver (No for S65 in FIG. 14), that is, if the inconsistent content is an unsent state, the inconsistent content of the inconsistency list on the user A or/and the receiver is updated without referring to any user information on the receiver or transmitting personal contact information (S66), and the user A or/and the receiver is informed (S67). The update of the inconsistent content in S66 is intended to update the time and date of checking or update the transmission content, but there is no need to implement the update. If the receiver is not registered in the inconsistency list (No for S64 in FIG. 14), it is researched whether or not the receiver is registered in a rejection list (S68), and if the receiver is registered in the rejection list (Yes for S68 in FIG. 14), only the user A is informed of being registered also in the rejection list without referring to any user information on the receiver or transmitting personal contact information (S69). If the receiver is not registered even in the rejection list (No for S68 in FIG. 14), the receiver will be specified to refer to a senders list in the user information, in accordance with processing of searching whether or not the receiver is registered in the user information and tentative ID (S70), for example, S3 of FIG. 7, S13 of FIG. 8, or S42 of FIG. 11. The same processing is executed in the case of checking a sender.

It is also possible to use the inconsistency of the unregistered receiver and unregistered sender in the input of a receiver or a sender. More specifically, a permitting intention of the other party is already made through the registration of a receiver or a sender on a user with an unregistered receiver or an unregistered sender in an inconsistency list, and personal contact information can be thus transmitted and received without referring to any user information on the receiver or sender.

(Output Processing)

The user can, via the client system 2, specify, browse, and download all or required items in a sender's personal contact information database accumulated in the center system 3, and update the content of contact information database of approved link partners, an address list, an address book, a phone book, etc. recorded on a terminal device of the user to up-to-date information in synchronization with the center system 3. Further, it is possible to use the contact information database of approved link partners as an address list, an address book, a phone book, etc., and a configuration can be also achieved in which the update to up-to-date information recorded on a terminal device of the user is implemented with the contact information database of approved link partners by synchronizing the terminal device of the user with the center system 3. Furthermore, a configuration may be adopted in which it is possible to output not only the senders' personal contact information database but also the other user information.

Figure 15:
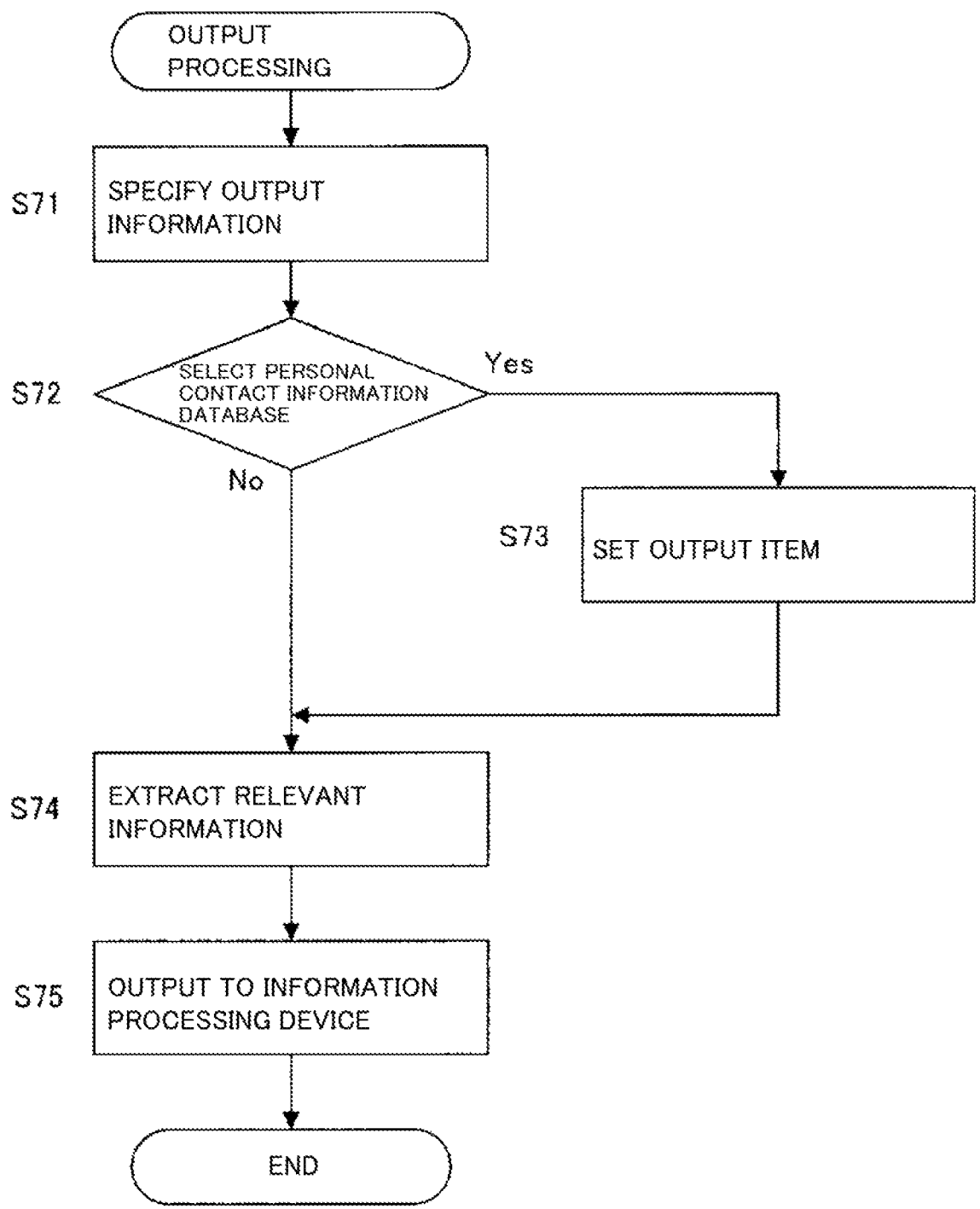
[FIG. 15] An example of a flowchart for processing of outputting (downloading) information.

FIG. 15 is an example of a flowchart for processing of outputting (downloading) information stored in the storage medium 32. User A is able to access and browse user information and a sender's personal contact information database on the user A, stored in the storage medium 32 of the center system 3, via the client system 2 in the information processing device 21, and a configuration is preferably adopted which is able to output at least some (in particular, the senders' personal contact information database) of the information to the information processing device 21. First, the user A specifies one or more pieces of information desired to be output (S71). For example, as in FIG. 16(A), a configuration may be adopted in which an output screen is displayed on the information processing device 21 of the client system 2 to select a check box for information to be output, or as in FIG. 16(B), a configuration may be adopted in which an output button 16 is provided on a screen for browsing target information to specify the information. If the selected output information is not the senders' personal contact information database (personal contact information, a receivers list, a reception list, checking result information, etc.) (No for S72), the selected information is extracted from the storage medium 32 (S74), and output (S75).

If the senders' personal contact information database is contained in the selected information (Yes for S72), output items are further set before outputting (S73). Items of personal contact information and a sender to be output can be set as the setting of output items. For example, the check boxes of "ALL", "ADDRESS LIST", and "PHONE BOOK" are provided below the senders' personal contact information database in FIG. 16(A), and configured so as to be able to collectively select the output of all of the senders' personal contact information database, the output of items (address, name, title, etc.) regarding the address list in the senders' personal contact information database, or the output of items (name, phone number, e-mail address, etc.) regarding the phone book therein. As described above, the function is preferably provided which is able to collectively set more than one item. The output items may be set by a user as in the case of the items to be disclosed. In addition, check boxes are provided further below which can select whether to output individual items. In addition, a configuration may be adopted so that it is possible to set which sender is selected from the senders' personal contact information database to output personal contact information. For example, senders may be divided into several groups, for example, into a company group, a university group, a relative group, etc., so that the groups can be selected for output, or a sender for output can be specified for output. Further, output items may be also set for the information other than the senders' personal contact information database.

(Delete Processing)

Figure 17:
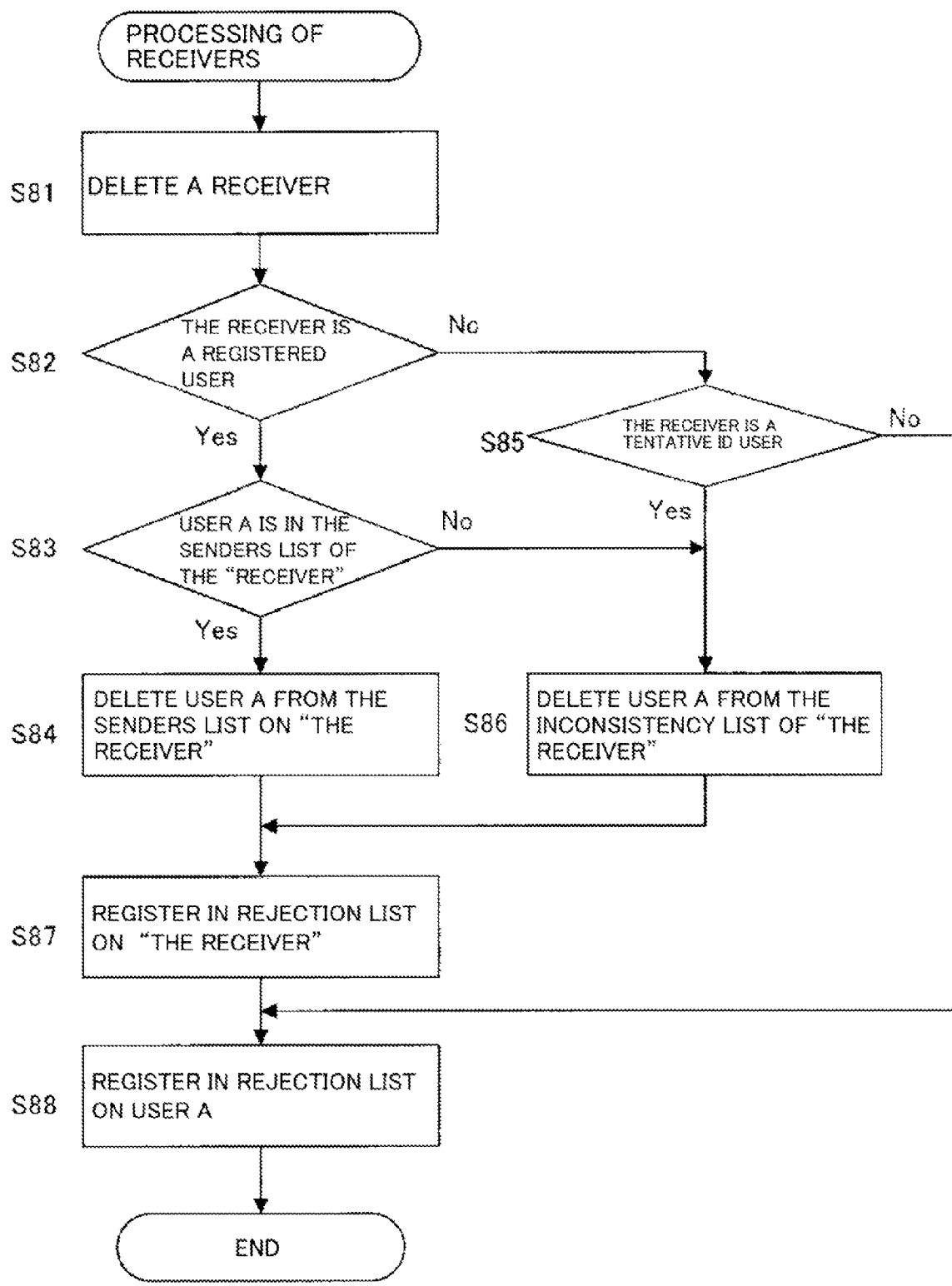
[FIG. 17] An example of a flowchart for processing of deleting a receiver.

Furthermore, this system can be configured so that in the case of deleting a receiver or a sender, in conjunction with the deletion, contact information database of approved link partners is deleted. FIG. 17 is an example of a flowchart for processing of deleting a receiver. When user A deletes one of receivers (S81), it is confirmed whether the receiver is a user or not (S82), and if the receiver is a user (Yes for S82), it is further confirmed whether or not the user is registered in a senders list on the receiver (S83). As a result, if the user A is registered in the sender list (Yes for S83), the user A registered in the sender list on the receiver is deleted (S84). Furthermore, the checking result in user information on the receiver is modified to register the user A in a rejection list on the receiver (S87), and register the receiver in a rejection list on the user A (S88). Alternatively, if the user A is not registered in the senders of (his/her) personal contact information on the receiver (No for S83), the user A is deleted from an inconsistency list on the receiver (S86) to register the user A in the rejection list on the receiver (S87) and register the receiver in the rejection list on the user A (S88). On the other hand, if the deleted receiver is not a user (No for S82), a search is further made in the tentative ID (S85), and if the receiver is located in the tentative ID (Yes for S85), the user A is deleted from the inconsistency list on the receiver (S86) to register the user A in the rejection list on the receiver (S87) and register the receiver in the rejection list on the user A (S88). If the receiver is located even in the tentative ID (No for S85), the receiver is registered in the rejection list on the user A (S88).

Figure 18:
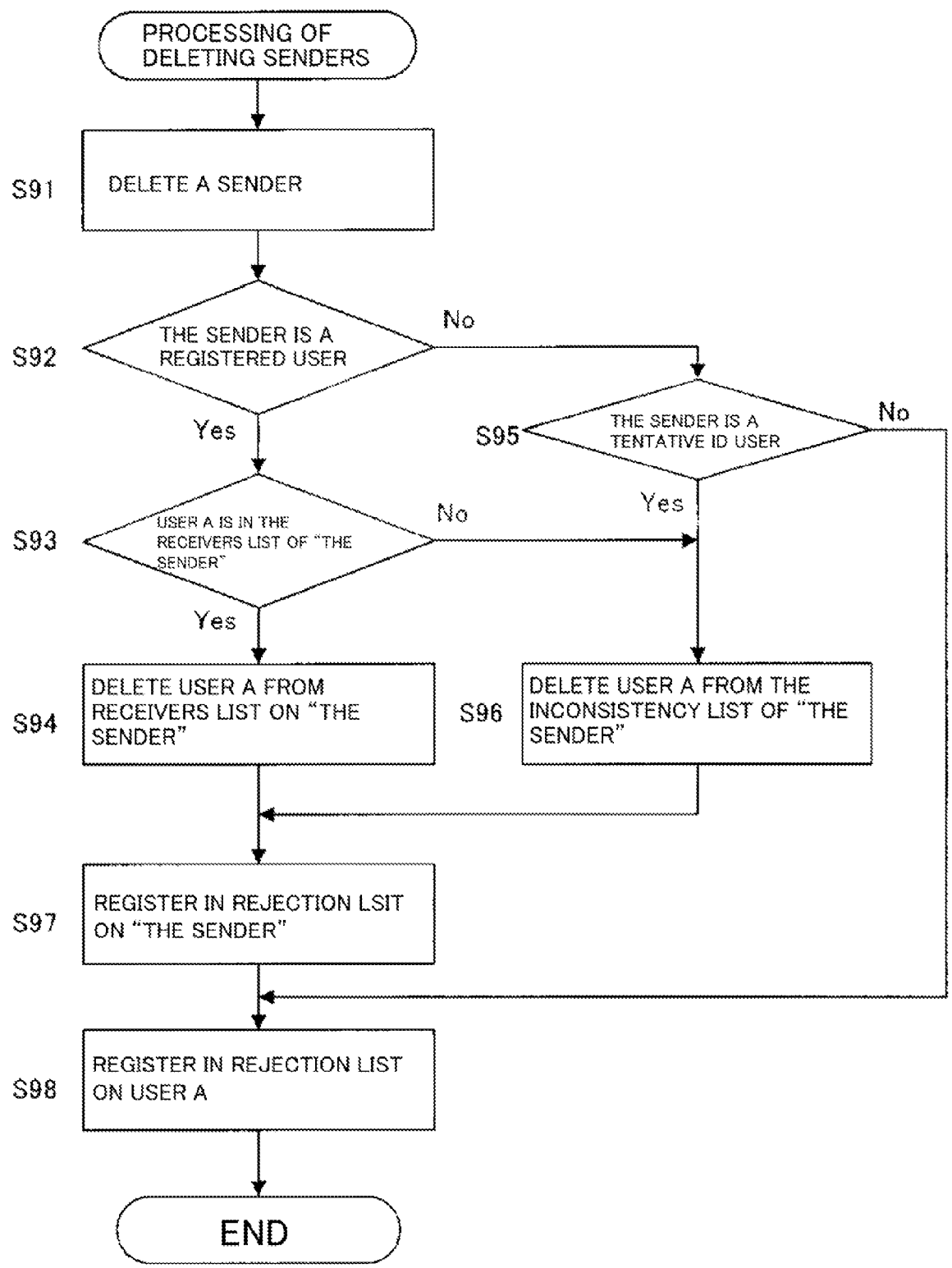
[FIG. 18] An example of a flowchart for processing of deleting a sender.

FIG. 18 is an example of a flowchart for processing of deleting a sender. When the user A deletes one of senders (S91), it is confirmed whether the sender is a user or not (S92), and if the sender is a user (Yes for S92), it is further confirmed whether or not the user is registered in a receivers list on the sender (S93). As a result, if the user A is registered in the receiver list (Yes for S93), the user A registered in the receiver list on the sender is deleted (S94). Furthermore, the checking result in user information on the sender is modified to register the user A in a rejection list on the sender (S97), and register the sender in a rejection list on the user A (S98). Alternatively, if the user A is not registered in the receiver list on the sender (No for S93), the user A is deleted from an inconsistency list on the sender (S96) to register the user A in the rejection list on the sender (S97) and register the sender in the rejection list on the user A (S98). On the other hand, if the deleted sender is not a user (No for S92), a search is further made in the tentative ID (S95), and if the sender is located in the tentative ID (Yes for S95), the user A is deleted from the inconsistency list on the sender (S96) to register the user A in the rejection list on the sender (S97) and register the sender in the rejection list on the user A (S98). If the sender is located even in the tentative ID (No for S95), the sender is registered in the rejection list on the user A (S98).

(Processing of Changing Name: FIG. 23)

The name of a user is one piece of personal contact information on the user, and often used as one piece of user identifying information, and in this regard, the user name is different from the other personal contact information such as a place of work or a title. When the system itself manages information with user names, the change of a user name greatly influences the system, and careful consideration should be conducted on the change, including the necessity of the change. However, when each piece of information is managed with the user ID, the change of the user name is also able to be achieved with relative ease. An example of processing for changing a user name in a system which manages each piece of information with the user ID will be described below with reference to FIG. 23. It is to be noted that the system which manages each piece of information with the user ID refers to a system which uses the user ID to execute the association with receivers or senders such as receiver lists and senders in the center system, and the receivers input by users may be user identifying information such as a user name and an e-mail address, and the input of the user ID as a receiver is not considered to be required (However, user ID may be input).

FIG. 23 is an example of a flowchart for processing in the case of changing a user name. When user A uses the client system 2 to change a user name of "Personal contact information" on the user A (S101), the center system 3 executes identification processing for confirming that the change is made by the intention of the user A. In FIG. 23, the center system 3 sends, to an e-mail address of the user A, an electronic mail including the execution of the processing for changing the user name and url for identification (S102) to request the user A to access the url and properly input the user ID, a password, etc. for login to confirm the changed content (S103). If the identification is executed (Yes for S103), the name in user information on the user A (S104), and further, the name of the user A is changed in a sender's personal contact information database on each receiver for a receiver registered in a consistency list by reference to the consistency list, among receivers registered in a receivers list in the user information on the user A (S105). In addition, on the receiver registered in the consistency list, the name of the user A in a senders list in user information for each receiver is changed to a new name (S106). Furthermore, on the receiver registered in the consistency list, if the user A is registered in a receivers list in the user information for each receiver, the name of the user A in the receiver list is changed to a new name (S106), and the processing for changing the user name is ended. If the identification is not executed for a predetermined period of time (for example, three days) (No for S103), it is reported to the e-mail address that the processing for changing the user name is cancelled (S107), the processing for changing the user name is ended.

As described above, in the case of changing the user name, a careful identification process is provided to prevent a leak of personal contact information due to user spoofing and improve the reliability of the system, because the user name is often handled as information for identifying an individual in light of common sense. In addition, if the user name is registered in not only the senders' personal contact information database on the receiver registered in the consistency list, but also the sender list, the user name in the receiver list is changed. In this regard, if the user A is registered in an inconsistency list, the name of the user A is not changed in the case of FIG. 23. This is because there is also a possibility that the other party recognizes the user A only with the previous name before the change at the time of the registration in the consistency list, and thus, the name of the user A will be rewritten to a new name after giving the notification that the name of the user A is changed if the other party permits the inconsistency list to consistency, without changing the name of the user A in the inconsistency list. However, depending on the purpose or use of the system, which list is selected to change the name may be selected appropriately. It is to be noted that while reference is made to the consistency list in FIG. 23, it may be checked if each receiver is registered as a sender.

Figure 24:
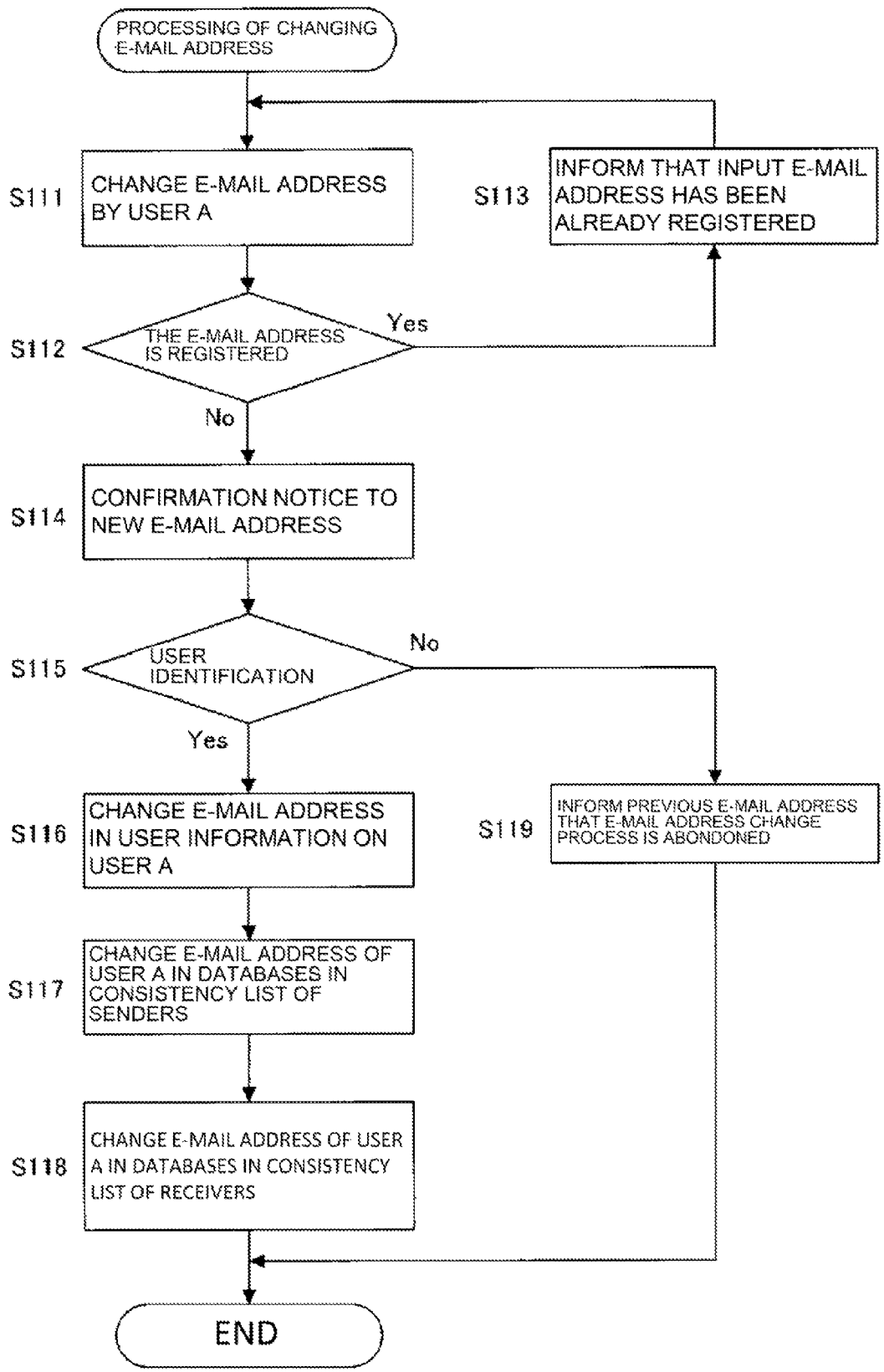
[FIG. 24] An example of a flowchart for processing of changing an e-mail address.

(Processing of Changing E-Mail Address: FIG. 24)

The e-mail address is, as in the case of the name, one piece of personal contact information on the user, and often used as one piece of user identifying information, and in this regard, the e-mail address is different from the other personal contact information such as a place of work or a title. Therefore, the change of the e-mail address is also able to be achieved with relative ease, when each piece of information is managed with the user ID.

FIG. 24 is an example of a flowchart for processing in the case of changing an e-mail address. When user A uses the client system 2 to change an e-mail address of "Personal contact information" on the user A (S111), the center system 3 checks whether or not the e-mail address corresponds with the e-mail address already registered as personal contact information in user information (S112). If the corresponding e-mail address is registered (Yes for S112), the user A is informed as an error message that the input e-mail address is registered (S113), and requested to again input another e-mail address, because the e-mail address is already registered by a user (including the user A) through the identification process. It is to be noted that if the new e-mail address from the user A is registered in another ID of the user A (because the user is identified by the user name and the e-mail address, it is possible for the same person to be registered by more than one ID through the change of the e-mail address), it is preferable to provide a system for integrating more than one ID into one. In addition, the new e-mail address from the user A is registered by other person, it is preferable provide coping means such as a search request to the center system.

If no corresponding e-mail address is registered (No for S112), the center system 3 executes identification processing for confirming that the change is made by the intention of the user A. In FIG. 24, the center system 3 sends, to the new e-mail address of the user A, an electronic mail including the execution of the processing for changing the e-mail address and url for identification (S114) to request the user A to access the url and properly input the user ID, a password, etc. for login to confirm the changed content (S115). If the identification is executed (Yes for S115), the e-mail address in user information on the user A (S116), and further, the e-mail address of the user A is changed in a sender's personal contact information database on each receiver for a receiver registered in a consistency list by reference to the consistency list, among receivers registered in a receivers list in the user information on the user A (S117). In addition, on the receiver registered in the consistency list, the e-mail address of the user A in a senders list in user information for each receiver is changed to a new e-mail address (S118). Furthermore, on the receiver registered in the consistency list, if the user A is registered in a receivers list in the user information for each receiver, the e-mail address of the user A in the receiver list is changed to a new e-mail address (S118), and the processing for changing the e-mail address is ended. If the identification is not executed for a predetermined period of time (for example, three days) (No for S115), it is reported to the previous e-mail address that the processing for changing the e-mail address is cancelled (S119), the processing for changing the user name is ended.

As described above, in the case of changing the e-mail address, the checking whether to correspond the e-mail address already registered as personal contact information or not and the identification are executed carefully to prevent a leak of personal contact information due to user spoofing and inputting errors, and improve the reliability of the system, because the e-mail address is important as one piece of information for identifying an individual, but at the same time, relatively frequently changed, also with imputing errors. Furthermore, in order to reduce the inputting errors, when the e-mail address is changed in S111, processing may be added in which the e-mail address is input twice to prevent inputting errors. In addition, if the e-mail address is registered in not only the senders' personal contact information database on the receiver registered in the consistency list, but also the sender list, the e-mail address in the receiver list is changed. As in the case of the processing for the user name, without changing any e-mail address in an inconsistency list, the e-mail address of the user A will be rewritten to a new e-mail address after giving the notification that the e-mail address A is changed if the other party permits the inconsistency list to consistency. However, depending on the purpose or use of the system, which list is selected to change the e-mail address may be selected appropriately. It is to be noted that while reference is made to the consistency list in FIG. 24, it may be checked if each receiver is registered as a sender.

Furthermore, it is also possible to add another e-mail, rather than the change of the e-mail address. In this case, basically, it is possible to achieve the addition of an e-mail address by adding, rather than changing, the e-mail address in the same flowchart as in FIG. 24.

It is to be noted that while the system mainly intended to update personal contact information regarding a list of contact information has been explained in the above description, the scope of the present invention is not to be considered limited to the configuration, and can be used in any systems for mutually transmitting and receiving information between specific users. In addition, the flowcharts in the above description are merely embodiments, which can be modified appropriately.

REFERENCE SIGNS LIST 1 information management system
2 client system
3 center system
4 network (telecommunication line)
21, 31 information processing device
32 storage medium

The invention claimed is:

1. An information update system comprising a center system and a client system which are connected via a network, the center system comprising an information processing device coupled to the network and a storage medium, wherein:
  the storage medium is configured for storing a personal contact information database for each user, the personal contact information database including personal self-information relating to a first user, a receivers list, and a consistency list, and personal contact information relating to at least another user;
  the client system is configured to receive or modify the personal self-information stored in the storage medium, and to register or change a receiver in the receivers list, the receiver being another user permitted to receive at least some of the personal self-information relating to the first user;
  the information processing device is configured to automatically update content of the personal contact information database for each user, and to register the receiver in the consistency list if a disclosing intention of the first user is consistent with a receiving intention of the receiver; and
  the information processing device, when the personal self-information of the first user is input or modified by the first user, automatically updates at least some of the input or modified personal self-information in the personal contact information database for each registered receiver in the consistency list.

2. The information update system of claim 1, wherein, if the disclosing intention of the first user is not consistent with the receiving intention of the receiver, information indicating that the first user and the receiver are not consistent is registered in an inconsistency list in the personal contact information database of at least one of the first user and the receiver.

3. The information update system according to claim 2, wherein the receiver registered in the inconsistency list is redefined as a receiver in the consistency list by modifying the personal contact information database of the receiver.

4. An information update system comprising a center system and a client system which are connected via a network, the center system comprising an information processing device coupled to the network and a storage medium, wherein:

the storage medium is configured for storing a personal contact information database for each user, the personal contact information database including personal self-information relating to a first user, a receivers list, and a senders list, and personal contact information relating to at least another user;

the client system is configured to receive or modify the personal self-information stored in the storage medium, and to register or change a receiver in the receivers list, the receiver being another user permitted to receive at least some of the personal self-information relating to the first user;

the client system is configured to register or change a sender in the senders list, the sender being another user permitted to modify content of the personal contact information database of the first user when personal contact information relating to the sender is received; and the information processing device is configured to automatically update content of the personal contact information database for each user, wherein, when a receiver is registered by a user in the receivers list, the information processing device updates at least some of the personal self-information of the user registering the receiver in the personal contact information database of the receiver if the user registering the receiver is a registered sender on the senders list of the receiver.

5. The information update system of claim 4, wherein, if the user registering the receiver is not a registered sender on the senders list of the receiver, information indicating that the user registering the receiver is not a registered sender is registered in an inconsistency list in the personal contact information database of at least one of the user registering the receiver and the receiver.

6. The information update system according to claim 5, wherein the user registered in the inconsistency list is redefined as a registered sender in the senders list of the receiver by modifying the personal contact information database of the receiver.

7. The information update system according to claim 5, wherein the information processing device registers the user in a consistency list if the user is registered, and the information processing device refers to the consistency list or the inconsistency list first, then checks against the personal contact information database of the receiver if the user is not registered in the consistency list or the inconsistency list.

8. An information update system comprising a center system and a client system which are connected via a network, the center system comprising an information processing device coupled to the network and a storage medium, wherein:

the storage medium is configured for storing a personal contact information database for each user, the personal contact information database including personal self-information relating to a first user, a receivers list, and a senders list, and personal contact information relating to at least another user;

the client system is configured to receive or modify the personal self-information stored in the storage medium, and to register or change a receiver in the receivers list, the receiver being another user permitted to receive at least some of personal self-information relating to the first user;

the client system is configured to register or change a sender in the senders list, the sender being another user permitted to modify content of the personal contact information database of the first user when personal contact information relating to the sender is received; and the information processing device is configured to automatically update content of the personal contact information database for each user, wherein, when a sender is registered by a user in the senders list, the information processing device updates at least some of the personal self-information of the sender in the personal contact information database of ell the user registering the sender if the user registering the sender is a registered receiver on the receivers list of the sender.

9. The information update system of claim 8, wherein, if the user registering the sender is not a registered receiver on the receivers list of the sender, information indicating that the user registering the sender is not a registered receiver is registered in an inconsistency list in the personal contact information database of at least one of the user registering the sender and the sender.

10. The information update system according to claim 9, wherein the user registered in the inconsistency list is redefined as a registered receiver in the receivers list of the sender by modifying the personal contact information database of the sender.

11. The information update system according to any one of claims 2-10, wherein, if the user is registered in the inconsistency list, and thereafter redefined as a receiver or a sender, registration of such redefined user is deleted from the inconsistency list.

12. The information update system according to claim 9, wherein the information processing device registers the user in a consistency list if the user is registered, and the information processing device refers to the consistency list or the inconsistency list first, then checks against the personal contact information database of the sender if the user is not registered in the consistency list or the inconsistency list.

* * * * *